United States Patent
Zhang et al.

(10) Patent No.: US 11,465,628 B2
(45) Date of Patent: Oct. 11, 2022

(54) ACCELERATION SLIP REGULATION METHOD AND VEHICLE

(71) Applicant: Huawei Technologies Co., Ltd., Shenzhen (CN)

(72) Inventors: Yongsheng Zhang, Shanghai (CN); Wei Zhang, Shanghai (CN); Biao Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 16/694,256

(22) Filed: Nov. 25, 2019

(65) Prior Publication Data

US 2020/0086877 A1 Mar. 19, 2020

Related U.S. Application Data

(63) Continuation of application No. PCT/CN2017/118200, filed on Dec. 25, 2017.

(30) Foreign Application Priority Data

May 26, 2017 (CN) .......................... 201710385375.8

(51) Int. Cl.
*B60W 30/18* (2012.01)
*B60W 40/105* (2012.01)
*B60W 50/038* (2012.01)

(52) U.S. Cl.
CPC .... *B60W 30/18172* (2013.01); *B60W 40/105* (2013.01); *B60W 50/038* (2013.01);
(Continued)

(58) Field of Classification Search
CPC combination set(s) only.
See application file for complete search history.

(56) References Cited

U.S. PATENT DOCUMENTS 5,219,212 A * 6/1993 Shimada ............... B60T 8/1755
188/181 A
5,927,426 A 7/1999 Hall et al.
(Continued)

FOREIGN PATENT DOCUMENTS

CN 1911706 A 2/2007
CN 101024377 A 8/2007
(Continued)

OTHER PUBLICATIONS

Magallan, G., et al., "Maximization of the Traction Forces in a 2WD Electric Vehicle," XP055682938, IEEE Transactions on Vehicular Technology, vol. 60, Issue: 2, Feb. 2011, pp. 369-380.
(Continued)

*Primary Examiner* — Jeff A Burke
*Assistant Examiner* — Madison B Emmett
(74) *Attorney, Agent, or Firm* — Conley Rose, P.C.

(57) ABSTRACT

An acceleration slip regulation method includes determining a current control phase of a vehicle in an acceleration slip regulation state, determining a current road surface adhesion coefficient of the vehicle, determining, based on the current control phase and the current road surface adhesion coefficient, maximum torque allowed by a road surface, obtaining demand torque received by a drive motor of the vehicle and a wheel slip rate of the vehicle, and outputting adaptive feedforward torque for acceleration slip regulation based on the maximum torque allowed by the road surface, the demand torque, and the wheel slip rate, where the adaptive feedforward torque is used to perform the acceleration slip regulation on the vehicle.

20 Claims, 12 Drawing Sheets

(52) U.S. Cl.
CPC ..... *B60W 2520/26* (2013.01); *B60W 2552/40* (2020.02); *B60W 2720/30* (2013.01)

(56) References Cited

U.S. PATENT DOCUMENTS

| | | | |
|---|---|---|---|
| 6,379,281 B1* | 4/2002 | Collins | B60W 30/18 477/110 |
| 6,580,994 B2 | 6/2003 | Katayama et al. | |
| 2001/0003805 A1* | 6/2001 | Koibuchi | B60K 28/16 180/197 |
| 2007/0038340 A1 | 2/2007 | Sekiguchi et al. | |
| 2009/0055068 A1* | 2/2009 | Osaki | B60K 28/16 701/87 |
| 2009/0115246 A1 | 5/2009 | Yanagida et al. | |
| 2009/0210128 A1* | 8/2009 | Fujimoto | B60W 50/0097 701/84 |
| 2010/0222953 A1* | 9/2010 | Tang | B60L 15/2036 701/22 |
| 2013/0211678 A1* | 8/2013 | Lee | B60W 10/20 701/42 |
| 2013/0274969 A1* | 10/2013 | Wang | B60W 20/00 903/946 |
| 2014/0336856 A1 | 11/2014 | Loos et al. | |
| 2015/0142240 A1 | 5/2015 | Ozaki | |
| 2015/0175009 A1 | 6/2015 | Beever et al. | |
| 2018/0236989 A1 | 8/2018 | Lian et al. | |
| 2019/0344796 A1* | 11/2019 | Lian | B60L 15/20 |

FOREIGN PATENT DOCUMENTS

| | | |
|---|---|---|
| CN | 101189141 A | 5/2008 |
| CN | 101920704 A | 12/2010 |
| CN | 201792857 U | 4/2011 |
| CN | 102501779 A | 6/2012 |
| CN | 103415415 A | 11/2013 |
| CN | 103502038 A | 1/2014 |
| CN | 103879305 A | 6/2014 |
| CN | 103886190 A | 6/2014 |
| CN | 104175902 A | 12/2014 |
| CN | 105667343 A | 6/2016 |
| CN | 105691381 A | 6/2016 |
| CN | 105751919 A | 7/2016 |
| CN | 106183892 A | 12/2016 |
| CN | 106427957 A | 2/2017 |
| CN | 106585425 A | 4/2017 |
| DE | 102014003992 B4 | 1/2016 |
| EP | 2106955 A1 | 10/2009 |
| JP | 2006034012 A | 2/2006 |
| JP | 4402980 B2 | 1/2010 |
| JP | 4936552 B2 | 5/2012 |
| JP | 2015521553 A | 7/2015 |
| JP | 5994703 B2 | 9/2016 |

OTHER PUBLICATIONS

Goggia, T., et al., "Integral Sliding Mode for the Torque-Vectoring Control of Fully Electric Vehicles: Theoretical Design and Experimental Assessment," XP011580961, IEEE Transactions on Vehicular Technology, vol. 64, Issue: 5, May 2015, 15 pages.

Chen, J., et al., "Traction control for electric vehicles: A novel control scheme," XP032210055, International Conference on Information and Automation (ICIA), Jun. 2012, 6 pages.

Ivanov, V., et al., "A Survey of Traction Control and Antilock Braking Systems of Full Electric Vehicles With Individually Controlled Electric Motors," IEEE Transactions on Vehicular Technology, vol. 64, Issue: 9, Sep. 2015, pp. 3878-3896.

Yin, D., et al., "A New Approach to Traction Control of EV Based on Maximum Effective Torque Estimation," IEEE 2008, pp. 2764-2769.

* cited by examiner

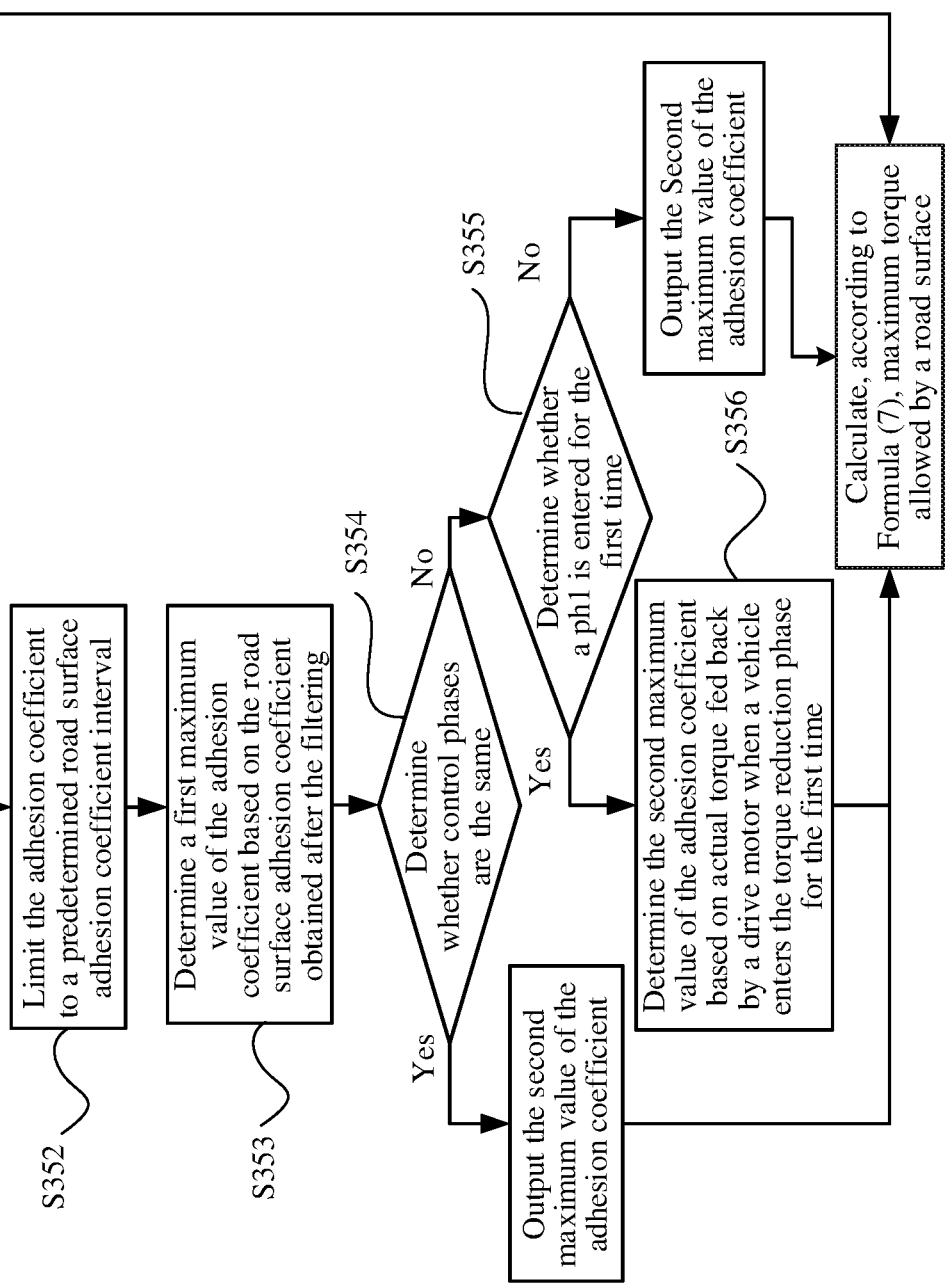

ACCELERATION SLIP REGULATION METHOD AND VEHICLE

CROSS-REFERENCE TO RELATED APPLICATIONS

This application is a continuation of International Patent Application No. PCT/CN2017/118200, filed on Dec. 25, 2017, which claims priority to Chinese Patent Application No. 201710385375.8, filed on May 26, 2017. The disclosures of the aforementioned applications are hereby incorporated by reference in their entireties.

TECHNICAL FIELD

This application relates to the vehicle field, and more specifically, to an acceleration slip regulation method and a vehicle.

BACKGROUND

A four-wheel independent drive electric vehicle has four independent controllable power sources, can control a driving force quickly and accurately based on a current vehicle velocity and a road surface adhesion condition, and has become a development trend for a next-generation electric vehicle.

In the national 973/863 program, a four-wheel independent drive key technology, especially a kinetic control technology (ABS/ASR/ESC) has been listed as a major project for key funding for several consecutive years. In the "national new energy vehicle major project" in 2017, the four-wheel independent drive key technology was listed again as a major common key technology for key funding. A technical reserve is intensely performed on the four-wheel independent drive key technology in corporations such as China FAW, BYD, and BAIC at home, and Japanese TOYOTA, German VOLKSWAGEN, and GENERAL MOTORS at abroad. It can be learned that in the near future, the four-wheel independent drive-related technology definitely becomes a hot spot in the vehicle industry.

A vehicle acceleration slip regulation (ASR) system, also referred to as a traction control system (TCS), implements a function of acceleration slip regulation of a drive wheel by controlling torque of the drive wheel. Kinetic control such as acceleration slip regulation on a four-wheel independent drive electric vehicle is mainly in a laboratory research phase, and there is little large-scale real car research. Therefore, the research is not thorough.

An acceleration slip regulation method mainly includes a logic threshold control method, a proportional-integral-derivative (PID) control method, a fuzzy control method, and the like, and the logic threshold and PID control methods are widely used.

A response speed is low, control accuracy is low, road surface adaptability is poor, and the like in acceleration slip regulation systems using an electric independent four-wheel drive electric vehicle.

SUMMARY

This application provides an acceleration slip regulation method and a vehicle, to help improve a response speed, enhance robustness, and improve control accuracy.

According to a first aspect, an acceleration slip regulation method is provided, and the method includes determining a current control phase of a vehicle in an acceleration slip regulation state, determining a current road surface adhesion coefficient of the vehicle, determining, based on the current control phase and the current road surface adhesion coefficient, maximum torque allowed by a road surface, and outputting demand torque for acceleration slip regulation based on the maximum torque allowed by the road surface, where the demand torque for the acceleration slip regulation is used to perform the acceleration slip regulation on the vehicle.

In some possible implementations, the determining a current control phase of a vehicle in an acceleration slip regulation state includes obtaining an actual torque signal of a drive motor of the vehicle, and identifying, based on the actual torque signal of the drive motor, the control phase in which the acceleration slip regulation is performed on the vehicle.

In some possible implementations, the outputting demand torque for acceleration slip regulation based on the maximum torque allowed by the road surface includes determining the demand torque for the acceleration slip regulation based on the maximum torque allowed by the road surface and the current road surface adhesion coefficient of the road surface.

In this embodiment of this application, the acceleration slip regulation method is used to improve a response speed, enhance robustness, and improve control accuracy.

With reference to the first aspect, in a first possible implementation of the first aspect, the determining, based on the current control phase and the current road surface adhesion coefficient, maximum torque allowed by a road surface includes, performing low-pass filtering on the current road surface adhesion coefficient, and determining a first maximum value of the adhesion coefficient, and if the current control phase of the vehicle is the same as a control phase of the vehicle in a first sampling period, determining, based on a second maximum value of the adhesion coefficient, the maximum torque allowed by the road surface, where the second maximum value of the adhesion coefficient is the first maximum value of the adhesion coefficient, and the first sampling period is a previous sampling period of a sampling period to which the current control phase belongs.

With reference to the first aspect, in a second possible implementation of the first aspect, the determining, based on the current control phase and the current road surface adhesion coefficient, maximum torque allowed by a road surface includes performing low-pass filtering on the current road surface adhesion coefficient, and determining a first maximum value of the adhesion coefficient, and if the current control phase of the vehicle is different from a control phase of the vehicle in a first sampling period, and the vehicle does not enter a torque reduction phase for the first time, determining, based on a second maximum value of the adhesion coefficient, the maximum torque allowed by the road surface, where the second maximum value of the adhesion coefficient is the first maximum value of the adhesion coefficient, the control phase includes the torque reduction phase, and the first sampling period is a previous sampling period of a sampling period to which the current control phase belongs.

With reference to the first or the second possible implementation of the first aspect, in a third possible implementation of the first aspect, the performing low-pass filtering on the current road surface adhesion coefficient, and determining a first maximum value of the adhesion coefficient based on the current road surface adhesion coefficient includes performing low-pass filtering on the current road surface adhesion coefficient, limiting a current road surface adhesion coefficient obtained after the filtering to a predetermined adhesion coefficient interval, and determining the first maximum value of the adhesion coefficient based on the current road surface adhesion coefficient obtained after the filtering.

With reference to the first aspect, in a fourth possible implementation of the first aspect, the method further includes determining actual torque fed back by the drive motor of the vehicle, and the determining, based on the current control phase and the current road surface adhesion coefficient, maximum torque allowed by a road surface includes, if the current control phase of the vehicle is different from a control phase of the vehicle in a first sampling period, and the vehicle enters a torque reduction phase for the first time, determining a second maximum value of the adhesion coefficient based on the actual torque fed back by the drive motor when the vehicle enters the torque reduction phase for the first time, and determining, based on the second maximum value of the adhesion coefficient, the maximum torque allowed by the road surface, where the control phase includes the torque reduction phase, and the first sampling period is a previous sampling period of a sampling period to which the current control phase belongs.

With reference to any one of the first to the fourth possible implementations of the first aspect, in a fifth possible implementation of the first aspect, the outputting demand torque for acceleration slip regulation based on the maximum torque allowed by the road surface includes determining feedback torque based on the second maximum value of the adhesion coefficient, determining feedforward torque based on the maximum torque allowed by the road surface, and determining the demand torque for the acceleration slip regulation based on the feedforward torque and the feedback torque.

According to the acceleration slip regulation method in this embodiment of this application, an algorithm for identifying the maximum torque allowed by the road surface is used to accurately identify the maximum torque allowed by the road surface and the current road surface adhesion coefficient.

With reference to the fifth possible implementation of the first aspect, in a sixth possible implementation of the first aspect, the method further includes determining a wheel slip rate of the vehicle and a vehicle velocity of the vehicle, and the determining feedback torque based on the second maximum value of the adhesion coefficient includes determining a first wheel slip rate and a first proportionality coefficient based on the second maximum value of the adhesion coefficient, determining a second wheel slip rate and a second proportionality coefficient based on the vehicle velocity of the vehicle, and determining the feedback torque according to a formula $T_{FB\_i} = \max(0, (\lambda_i - (\lambda_{0\_i}(v_x) + \lambda_{0\_i}(\mu_{max\_i})))(K_{p\_i}(v_x) + K_{p\_i}(\mu_{max\_i})))$, wherein $T_{FB\_i}$ is the feedback torque, i represents any one of the wheels of the vehicle, and the wheels of the vehicle include a left front wheel, a right front wheel, a left rear wheel, and a right rear wheel, $\lambda_i$ is the wheel slip rate of the vehicle; $\mu_{max\_i}$ is the second maximum value of the adhesion coefficient, $v_x$ is the vehicle velocity of the vehicle, $\lambda_{0\_i}(\mu_{max\_i})$ is the first wheel slip rate, $\lambda_{0\_i}(v_x)$ is the second wheel slip rate, $K_{p\_i}(\mu_{max\_i})$ is the first proportionality coefficient, and $K_{p\_i}(v_x)$ is the second proportionality coefficient.

With reference to the fifth possible implementation of the first aspect, in a seventh possible implementation of the first aspect, the method further includes determining demand torque received by the drive motor of the vehicle, and the determining feedforward torque based on the maximum torque allowed by the road surface includes determining first torque based on a wheel slip rate, and determining the feedforward torque according to a formula $$T_{FF\_i} = \min\left(T_{dem\_i} \frac{1}{\tau_1 s^2 + \tau_2 s + 1}, (T_{max\_i} + f(\lambda_i))\right),$$

where $T_{FF\_i}$ is the feedforward torque, $T_{dem\_i}$ is the demand torque received by the drive motor, $T_{max\_i}$ is the maximum torque allowed by the road surface, $\tau_1$ is a time constant of a first filter, $\tau_2$ is a time constant of a second filter, and $f(\lambda_i)$ is the first torque.

According to the acceleration slip regulation method in this embodiment of this application, an adaptive feedforward and feedback joint control method is used to enhance robustness of a system and improve a response speed of the system.

With reference to any one of the fifth to the seventh possible implementations of the first aspect, in an eighth possible implementation of the first aspect, the demand torque for the acceleration slip regulation is a sum of the feedforward torque and the feedback torque.

With reference to any one of the first to the eighth possible implementations of the first aspect, in a ninth possible implementation of the first aspect, before the determining a current road surface adhesion coefficient, the method further includes obtaining a road surface gradient, determining a wheel vertical load of the vehicle based on the road surface gradient, and determining the wheel ground driving force based on the wheel vertical load, and the determining a current road surface adhesion coefficient includes determining the current road surface adhesion coefficient based on the wheel ground driving force.

With reference to the ninth possible implementation of the first aspect, in a tenth possible implementation of the first aspect, the determining the wheel ground driving force based on the wheel vertical load includes determining the wheel ground driving force of the vehicle according to a formula $$T_{d\_i} = T_{motor\_i} i_g - I_w \frac{a_{wF\_i}}{r} - f_0 F_{z\_i} r,$$

where $T_{d\_i}$ is the wheel ground driving force, $T_{motor\_i}$ is the actual torque fed back by the drive motor, $i_g$ is a reduction ratio of the vehicle, $I_w$ is wheel rotation inertia of the vehicle, $a_{wF\_i}$ is the wheel acceleration obtained after filtering, r is a wheel radius of the vehicle, $f_0$ is a rolling resistance coefficient of the vehicle, and $F_{z\_i}$ is the wheel vertical load of the vehicle.

With reference to the tenth possible implementation of the first aspect, in an eleventh possible implementation of the first aspect, the determining the current road surface adhesion coefficient based on the wheel ground driving force includes determining the current road surface adhesion coefficient according to a formula $$\mu_i = \frac{T_{d\_i}}{F_{z\_i} r},$$

where $\mu_i$ is the current road surface adhesion coefficient.

With reference to the eleventh possible implementation of the first aspect, in a twelfth possible implementation of the first aspect, the determining maximum torque allowed by a road surface includes determining, according to a formula $$T_{max\_i} = (\mu_{max\_i} + f_0)F_{z\_i}r + I_w \frac{a_{wF\_i}}{r},$$

the maximum torque allowed by the road surface, where $\mu_{max\_i}$ is the second maximum value of the adhesion coefficient.

With reference to any one of the first aspect, or the first to the twelfth possible implementations of the first aspect, in a thirteenth possible implementation of the first aspect, before the control phase in which the acceleration slip regulation is performed on the vehicle is determined, the method further includes determining a wheel velocity of the vehicle, a yaw angular velocity of the vehicle, and a steering wheel angle of the vehicle, determining a wheel acceleration of the vehicle based on the wheel velocity of the vehicle, determining the wheel slip rate based on the wheel velocity of the vehicle, the vehicle velocity of the vehicle, and the steering wheel angle and the yaw angular velocity that are of the vehicle, and determining, based on the wheel slip rate and/or the wheel acceleration, that the vehicle enters the acceleration slip regulation state.

According to the acceleration slip regulation method in this embodiment of this application, impact of vehicle steering on calculation is considered during the calculation of the wheel slip rate, so that the wheel slip rate is accurately calculated during straight driving, and can also be accurately calculated during turning driving.

With reference to the thirteenth possible implementation of the first aspect, in a fourteenth possible implementation of the first aspect, the determining the wheel slip rate of the vehicle based on the wheel velocity of the vehicle, the vehicle velocity of the vehicle, and the steering wheel angle and the yaw angular velocity that are of the vehicle includes determining the wheel slip rate according to a formula $$\lambda_i = \begin{cases} \dfrac{v_{w\_i} - \left(v_x \pm \psi\dfrac{t_w}{2}\right)\cos(\delta) - \psi L \sin(\delta)}{\max\left(v_{w\_i}, \left(v_x \pm \psi\dfrac{t_w}{2}\right)\cos(\delta) + \psi L \sin(\delta)\right)} & v_x > v_{TH} \\ 0 & v_x \leq v_{TH} \end{cases},$$

where $v_{w\_i}$ is the wheel velocity of the vehicle, $t_w$ is a wheel track of the vehicle, $v_{TH}$ is a predetermined velocity threshold, $\psi$ is the yaw angular velocity of the vehicle, $\delta$ is the steering wheel angle of the vehicle, and L is a wheel base of the vehicle.

According to a second aspect, a vehicle is provided, and the vehicle includes an electronic control unit, configured to determine a current control phase of the vehicle in an acceleration slip regulation state, and a sensor, configured to obtain a current road surface parameter. The electronic control unit is further configured to determine a current road surface adhesion coefficient of the vehicle based on the current road surface parameter. The electronic control unit is further configured to determine, based on the current control phase and the current road surface adhesion coefficient, maximum torque allowed by a road surface. The electronic control unit is further configured to output, to a drive motor, demand torque for acceleration slip regulation based on the maximum torque allowed by the road surface, where the demand torque for the acceleration slip regulation is used to perform the acceleration slip regulation on the vehicle.

In some possible implementations, the electronic control unit is configured to obtain an actual torque signal of the drive motor of the vehicle, and identify, based on the actual torque signal of the drive motor, the control phase in which the acceleration slip regulation is performed on the vehicle.

In some possible implementations, the electronic control unit is further configured to determine the demand torque for the acceleration slip regulation based on the maximum torque allowed by the road surface and the current road surface adhesion coefficient.

The vehicle in this embodiment of this application is used to improve a response speed, enhance robustness, and improve control accuracy.

With reference to the second aspect, in a first possible implementation of the second aspect, the electronic control unit is configured to perform filtering on the current road surface adhesion coefficient, and determine a first maximum value of the adhesion coefficient, and if the current control phase of the vehicle is the same as a control phase of the vehicle in a first sampling period, determine, based on a second maximum value of the adhesion coefficient, the maximum torque allowed by the road surface, where the second maximum value of the adhesion coefficient is the first maximum value of the adhesion coefficient, and the first sampling period is a previous sampling period of a sampling period to which the current control phase belongs.

With reference to the second aspect, in a second possible implementation of the second aspect, the electronic control unit is configured to determine a first maximum value of the adhesion coefficient based on the current road surface adhesion coefficient, and if the current control phase of the vehicle is different from a control phase of the vehicle in a first sampling period, and the vehicle does not enter a torque reduction phase for the first time, determine, based on a second maximum value of the adhesion coefficient, the maximum torque allowed by the road surface, where the second maximum value of the adhesion coefficient is the first maximum value of the adhesion coefficient, the control phase includes the torque reduction phase, and the first sampling period is a previous sampling period of a sampling period to which the current control phase belongs.

With reference to the first or the second possible implementation of the second aspect, in a third possible implementation of the second aspect, the electronic control unit is further configured to perform filtering on the current road surface adhesion coefficient, limit a current road surface adhesion coefficient obtained after the filtering to a predetermined adhesion coefficient interval, and determine the first maximum value of the adhesion coefficient based on the current road surface adhesion coefficient obtained after the filtering.

With reference to the second aspect, in a fourth possible implementation of the second aspect, the sensor is further configured to obtain actual torque fed back by the drive motor of the vehicle. The electronic control unit is further configured to, if the current control phase of the vehicle is different from a control phase of the vehicle in a first sampling period, and the vehicle enters a torque reduction phase for the first time, determine a second maximum value of the adhesion coefficient based on the actual torque fed back by the drive motor when the vehicle enters the torque reduction phase for the first time, and determine, based on the second maximum value of the adhesion coefficient, the maximum torque allowed by the road surface, where the first sampling period is a previous sampling period of a sampling period to which the current control phase belongs.

With reference to any one of the first to the fourth possible implementations of the second aspect, in a fifth possible implementation of the second aspect, the electronic control unit is configured to determine feedback torque based on the second maximum value of the adhesion coefficient, determine feedforward torque based on the maximum torque allowed by the road surface, and determine the demand torque for the acceleration slip regulation based on the feedforward torque and the feedback torque.

According to the vehicle in this embodiment of this application, an algorithm for identifying the maximum torque allowed by the road surface is used to accurately identify the maximum torque allowed by the road surface and the current road surface adhesion coefficient.

With reference to the fifth possible implementation of the second aspect, in a sixth possible implementation of the second aspect, the sensor is further configured to obtain a wheel slip rate of the vehicle and a vehicle velocity of the vehicle. The electronic control unit is configured to determine a first wheel slip rate and a first proportionality coefficient based on the second maximum value of the adhesion coefficient, determine a second wheel slip rate and a second proportionality coefficient based on the vehicle velocity of the vehicle, and determine the feedback torque according to a formula $T_{FB\_i}=\max(0,(\lambda_i-(\lambda_{0\_i}(v_x)+\lambda_{0\_i}(\mu_{max\_i})))(K_{p\_i}(v_x)+K_{p\_i}(\mu_{max\_i})))$, where $T_{FB\_i}$ is the feedback torque, i represents any one of the wheels of the vehicle, and the wheels of the vehicle include a left front wheel, a right front wheel, a left rear wheel, and a right rear wheel, $\lambda_i$ is the wheel slip rate of the vehicle, $\mu_{max\_i}$ is the second maximum of the adhesion coefficient, $v_x$ is the vehicle velocity of the vehicle, $\lambda_{0\_i}(\mu_{max\_i})$ is the first wheel slip rate, $\lambda_{0\_i}(v_x)$ is the second wheel slip rate, $K_{p\_i}(\mu_{max\_i})$ is the first proportionality coefficient, and $K_{p\_i}(v_x)$ is the second proportionality coefficient.

With reference to the fifth possible implementation of the second aspect, in a seventh possible implementation of the second aspect, the sensor is further configured to obtain demand torque received by the drive motor of the vehicle. The electronic control unit is configured to determine first torque based on the wheel slip rate, and determine the feedforward torque according to a formula $$T_{FF\_i} = \min\left(T_{dem\_i}\frac{1}{\tau_1 s^2 + \tau_2 s + 1}, (T_{max\_i} + f(\lambda_i))\right),$$

where $T_{FF\_i}$ is the feedforward torque $T_{dem\_i}$ is the demand torque received by the drive motor, $T_{max\_i}$ is the maximum torque allowed by the road surface, $\tau_1$ is a time constant of a first filter, $\tau_2$ is a time constant of a second filter, and $f(\lambda_i)$ is the first torque.

According to the vehicle in this embodiment of this application, an adaptive feedforward and feedback joint control method is used to implement acceleration slip regulation, to help enhance robustness and improve a response speed.

With reference to any one of the fifth to the seventh possible implementations of the second aspect, in an eighth possible implementation of the second aspect, the demand torque for the acceleration slip regulation is a sum of the feedforward torque and the feedback torque.

With reference to any one of the first to the eighth possible implementations of the second aspect, in a ninth possible implementation of the second aspect, the sensor is further configured to obtain a road surface gradient. The electronic control unit is further configured to determine a wheel vertical load of the vehicle based on the road surface gradient, determine the wheel ground driving force based on the wheel vertical load, and determine the current road surface adhesion coefficient based on the wheel ground driving force.

With reference to the ninth possible implementation of the second aspect, in a tenth possible implementation of the second aspect, the electronic control unit is configured to determine the wheel ground driving force of the vehicle according to a formula $$T_{d\_i} = T_{motor\_i}i_g - I_w\frac{a_{wF\_i}}{r} - f_0 F_{z\_i}r,$$

where $T_{d\_i}$ is the wheel ground driving force, $T_{motor\_i}$ is the actual torque fed back by the drive motor, $i_g$ is a reduction ratio of the vehicle, $I_w$ is wheel rotation inertia of the vehicle, $a_{wF\_i}$ is the wheel acceleration obtained after filtering, r is a wheel radius of the vehicle, $f_0$ is a wheel slip resistance coefficient of the vehicle, and $F_{z\_i}$ is the wheel vertical load of the vehicle.

With reference to the tenth possible implementation of the second aspect, in an eleventh possible implementation of the second aspect, the electronic control unit is configured to determine the current road surface adhesion coefficient according to a formula $$\mu_i = \frac{T_{d\_i}}{F_{z\_i}r},$$

where $\mu_i$ is the current road surface adhesion coefficient.

With reference to the eleventh possible implementation of the second aspect, in a twelfth possible implementation of the second aspect, the electronic control unit is configured to determine, according to a formula $$T_{max\_i} = (\mu_{max\_i} + f_0)F_{z\_i}r + I_w\frac{a_{wF\_i}}{r},$$

the maximum torque allowed by the road surface, where $\mu_{max\_i}$ is the second maximum value of the adhesion coefficient.

With reference to any one of the second aspect, or the first to the twelfth possible implementations of the second aspect, in a thirteenth possible implementation of the second aspect, the sensor is further configured to obtain a wheel velocity of the vehicle, a yaw angular velocity of the vehicle, and a steering wheel angle of the vehicle. The electronic control unit is further configured to determine a wheel acceleration of the vehicle based on the wheel velocity of the vehicle, determine the wheel slip rate based on the wheel velocity of the vehicle, the vehicle velocity of the vehicle, and the steering wheel angle and the yaw angular velocity that are of the vehicle, and determine, based on the wheel slip rate and/or the wheel acceleration, that the vehicle enters the acceleration slip regulation state.

According to the vehicle in this embodiment of this application, impact of vehicle steering on calculation is considered during the calculation of the wheel slip rate, so that the wheel slip rate is accurately calculated during straight driving, and can also be accurately calculated during turning driving.

With reference to the thirteenth possible implementation of the second aspect, in a fourteenth possible implementation of the second aspect, the electronic control unit is configured to determine the wheel slip rate according to a formula $$\lambda_i = \begin{cases} \dfrac{v_{w\_i} - \left(v_x \pm \psi\dfrac{t_w}{2}\right)\cos(\delta) - \psi L \sin(\delta)}{\max\left(v_{w\_i}, \left(v_x \pm \psi\dfrac{t_w}{2}\right)\cos(\delta) + \psi L \sin(\delta)\right)} & v_x > v_{TH} \\ 0 & v_x \le v_{TH} \end{cases},$$

where $v_{w\_i}$ is the wheel velocity of the vehicle, $t_W$ is a wheel track of the vehicle, $v_{TH}$ is a predetermined velocity threshold, $\psi$ is the yaw angular velocity of the vehicle, $\delta$ is the steering wheel angle of the vehicle, and L is a wheel base of the vehicle.

According to a third aspect, a computer readable storage medium is provided, and includes an instruction. When running on a computer, the computer readable storage medium enables the computer to perform the method according to the foregoing aspects.

According to a fourth aspect, a computer program product is provided. When running on a computer, the computer program product enables the computer to perform the method according to the foregoing aspects.

According to a fifth aspect, an acceleration slip regulation method is provided, and the method includes determining a current control phase of a vehicle in an acceleration slip regulation state, determining a current road surface adhesion coefficient of the vehicle, determining, based on the current control phase and the current road surface adhesion coefficient, maximum torque allowed by a road surface, obtaining demand torque received by a drive motor of the vehicle and a wheel slip rate of the vehicle, and outputting adaptive feedforward torque for acceleration slip regulation based on the maximum torque allowed by the road surface, the demand torque, and the wheel slip rate, where the adaptive feedforward torque is used to perform the acceleration slip regulation on the vehicle.

With reference to the fifth aspect, in a first possible implementation of the fifth aspect, the outputting adaptive feedforward torque for acceleration slip regulation based on the maximum torque allowed by the road surface, the demand torque, and the wheel slip rate includes determining the adaptive feedforward torque according to a formula $$T_{FF\_i} = \min\left(T_{dem\_i}\dfrac{1}{\tau_1 s^2 + \tau_2 s + 1}, (T_{max\_i} + f(\lambda_i))\right),$$

where $T_{FF\_i}$ is the adaptive feedforward torque $T_{dem\_i}$ is the demand torque received by the drive motor, $T_{max\_i}$ is the maximum torque allowed by the road surface, $\tau_1$ is a time constant of a first filter, $\tau_2$ is a time constant of a second filter, and $f(\lambda_i)$ is torque modified based on the wheel slip rate.

With reference to the first possible implementation of the fifth aspect, in a second possible implementation of the fifth aspect, that the modified torque is calculated based on the wheel slip rate includes determining, based on the wheel slip rate, whether the vehicle returns to a stable area, if the vehicle returns to the stable area, starting a stable timer, and calculating the modified torque based on a time length recorded by the timer.

According to a sixth aspect, a vehicle is provided, and the vehicle includes a sensor, configured to obtain a current road surface parameter, demand torque received by a drive motor of the vehicle, and a wheel slip rate of the vehicle, and a processor, configured to determine a current control phase of the vehicle in an acceleration slip regulation state, determine a current road surface adhesion coefficient of the vehicle based on the current road surface parameter, determine, based on the current control phase and the current road surface adhesion coefficient, maximum torque allowed by a road surface, and output adaptive feedforward torque for acceleration slip regulation based on the maximum torque allowed by the road surface, the demand torque, and the wheel slip rate, where the adaptive feedforward torque is used to perform the acceleration slip regulation on the vehicle.

In some possible implementations, the processor is the electronic control unit in the second aspect.

With reference to the sixth aspect, in a first possible implementation of the sixth aspect, the processor is configured to calculate the adaptive feedforward torque according to the following formula:

$$T_{FF\_i} = \min\left(T_{dem\_i}\dfrac{1}{\tau_1 s^2 + \tau_2 s + 1}, (T_{max\_i} + f(\lambda_i))\right),$$

and determine the adaptive feedforward torque, where $T_{FF\_i}$ is the adaptive feedforward torque $T_{dem\_i}$ is the demand torque received by the drive motor, $T_{max\_i}$ is the maximum torque allowed by the road surface, $\tau_1$ is a time constant of a first filter, $\tau_2$ is a time constant of a second filter, and $f(\lambda_i)$ is torque modified based on the wheel slip rate.

With reference to the first possible implementation of the sixth aspect, in a second possible implementation of the sixth aspect, that the processor is configured to calculate the modified torque based on the wheel slip rate includes determining, based on the wheel slip rate, whether the vehicle returns to a stable area, if the vehicle returns to the stable area, starting a stable timer, and calculating the modified torque based on a time length recorded by the stable timer.

BRIEF DESCRIPTION OF DRAWINGS

FIG. 7A and FIG. 7B are a schematic flowchart of a method for determining a current road surface adhesion coefficient and maximum torque allowed by a road surface according to an embodiment of this application.

DESCRIPTION OF EMBODIMENTS

The following describes technical solutions in this application with reference to the accompanying drawings.

Figure 1:
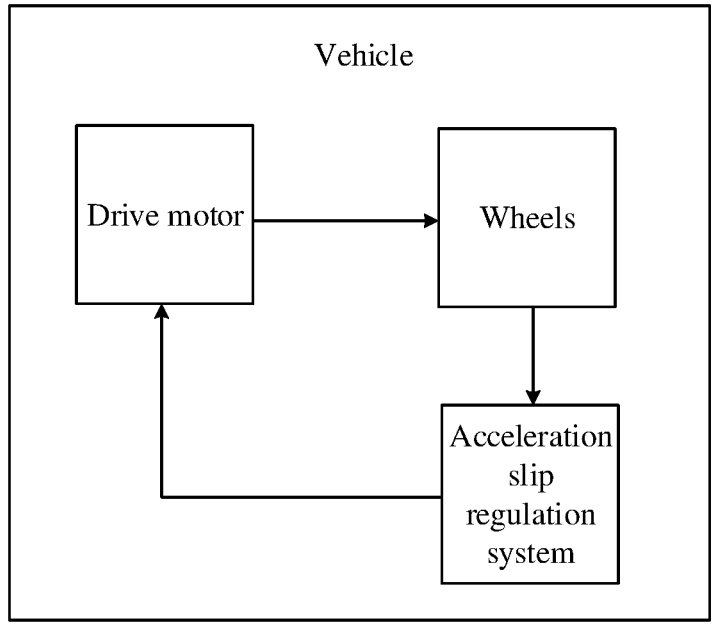
FIG. 1 is a schematic diagram of an application scenario of a technical solution according to an embodiment of this application.

Embodiments of this application are applicable to various vehicles on which acceleration slip regulation needs to be performed. FIG. 1 is a schematic diagram of an application scenario of a technical solution according to an embodiment of this application. As shown in FIG. 1, a vehicle includes a drive motor, wheels, and an acceleration slip regulation system. The drive motor outputs torque to control the wheels, and the acceleration slip regulation system adjusts the drive motor by collecting various signals of the wheels to better control the torque that is output by the drive motor, to perform acceleration slip regulation on the vehicle.

It should be understood that the vehicle in FIG. 1 includes only the apparatus in this application. A person skilled in the art may understand that a structure of the vehicle shown in FIG. 1 constitutes no limitation on the vehicle, and may include more components than those shown in the figure, or combine some components, or have different component arrangements.

Figure 2:
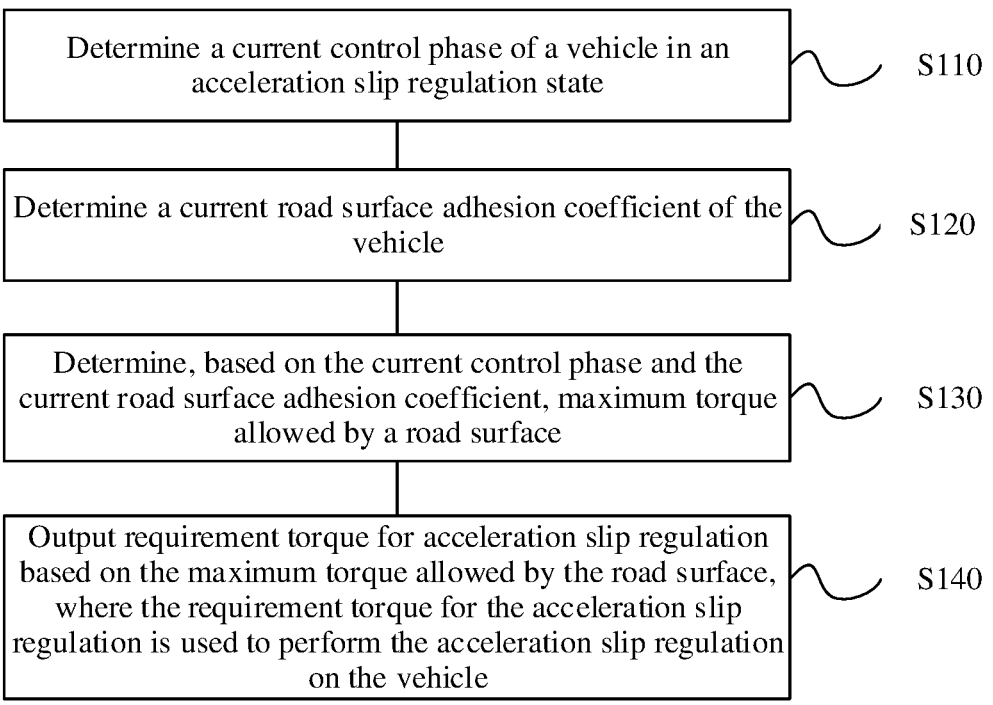
FIG. 2 is a schematic flowchart of an acceleration slip regulation method according to an embodiment of this application.

FIG. 2 is a schematic flowchart of an acceleration slip regulation method 100 according to an embodiment of this application. As shown in FIG. 2, the method 100 may be performed by the acceleration slip regulation system in FIG. 1. The method 100 includes the following steps.

S110. Determine a current control phase of a vehicle in an acceleration slip regulation state.

Figure 3:
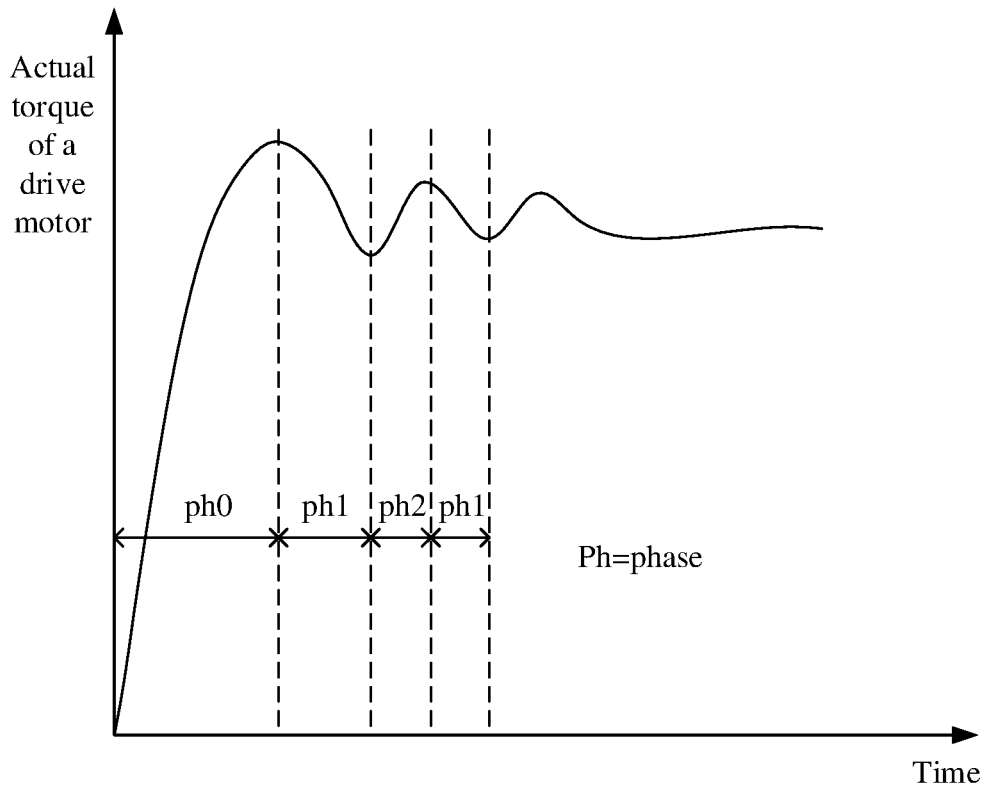
FIG. 3 is a schematic diagram of a control phase according to an embodiment of this application.

The acceleration slip regulation system may identify a TCS control phase $TCS_{phase\_i}$ based on an actual torque signal $T_{motor\_i}$ of a drive motor. FIG. 3 is a schematic diagram of a control phase according to an embodiment of this application. The control phase $TCS_{phase\_i}$ may include a non-control phase ph0, a TCS torque reduction phase ph1, and a TCS torque increase phase ph2, where i represents any one of the wheels. It is assumed that i of a left front wheel is equal to 1, i of a right front wheel is equal to 2, i of a left rear wheel is equal to 3, and i of a right rear wheel is equal to 4.

It should be understood that the control phase in this embodiment of this application is not limited to the foregoing three control phases, and may further include more or fewer control phases. This application is not limited thereto.

It should be further understood that stability of the wheels of the vehicle is reflected in the control phase. If the wheels slip, the drive motor is controlled to reduce torque. If the wheels do not slip, the drive motor is controlled to increase torque until a critical point at which the wheels slip is reached. A purpose of acceleration slip regulation is to search for this critical point to improve traction, and in addition, to maintain vehicle driving stability.

It should be further understood that in the acceleration slip regulation method in this embodiment of this application, the current control phase of the vehicle is determined using the actual torque signal of the drive motor, and the control phase may also be determined using another method. This application is not limited thereto.

Optionally, before the control phase in which the acceleration slip regulation is performed on the vehicle is determined, the method 100 further includes determining a wheel acceleration $a_{w\_i}$ and a wheel slip rate $\lambda_i$ that are of the vehicle.

Figure 4:
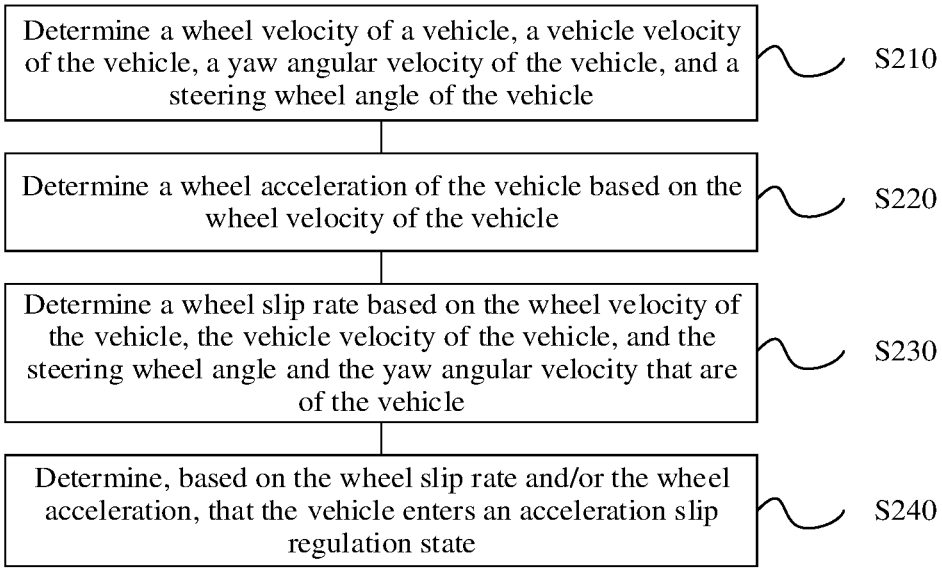
FIG. 4 is a schematic flowchart of a method for determining a wheel acceleration and a wheel slip rate according to an embodiment of this application.

FIG. 4 is a schematic flowchart of a method 200 for determining a wheel acceleration and a wheel slip rate according to an embodiment of this application. As shown in FIG. 4, the method 200 includes the following steps.

S210. Determine a wheel velocity of the vehicle, a vehicle velocity of the vehicle, a yaw angular velocity of the vehicle, and a steering wheel angle of the vehicle.

The acceleration slip regulation system may obtain the wheel velocity $v_{w\_i}$ of the vehicle, the vehicle velocity $v_x$ of the vehicle, the yaw angular velocity $\psi$ of the vehicle, and the steering wheel angle $\delta$ of the vehicle using a sensor, and may also obtain the foregoing parameters in another manner. This application is not limited thereto.

S220. Determine a wheel acceleration of the vehicle based on the wheel velocity of the vehicle.

Figure 5:
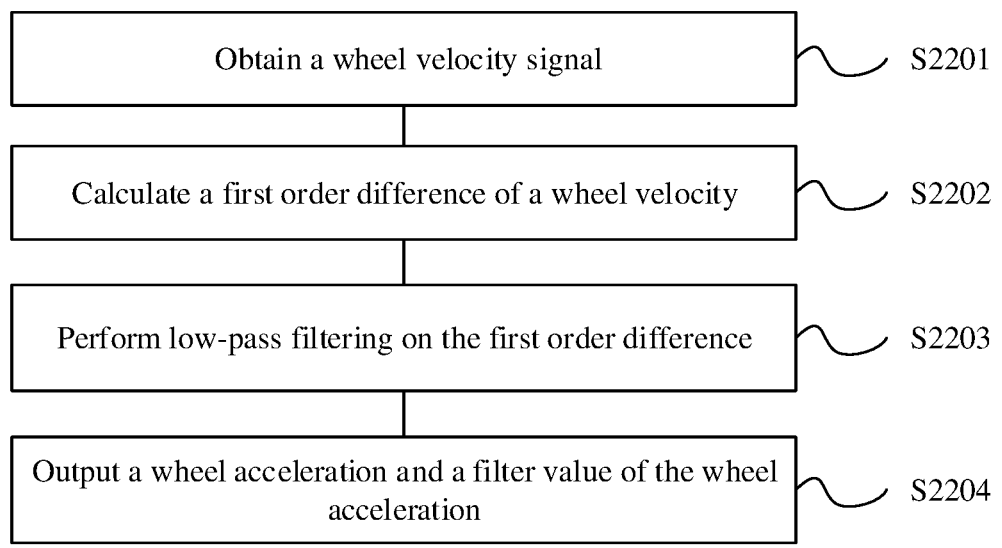
FIG. 5 is a schematic flowchart of a method for determining a wheel acceleration according to an embodiment of this application.

FIG. 5 is a schematic flowchart of a method for determining a wheel acceleration according to an embodiment of this application. As shown in FIG. 5, the method for determining a wheel acceleration may be implemented in the following steps.

S2201. Obtain a wheel velocity signal.

S2202. Calculate a first order difference of the wheel velocity.

S2203. Perform low-pass filtering on the first order difference.

S2204. Output the wheel acceleration and a filter value $a_{wF\_i}$ of the wheel acceleration.

S230. Determine a wheel slip rate based on the wheel velocity of the vehicle, the vehicle velocity of the vehicle, and the steering wheel angle and the yaw angular velocity that are of the vehicle.

Figure 6:
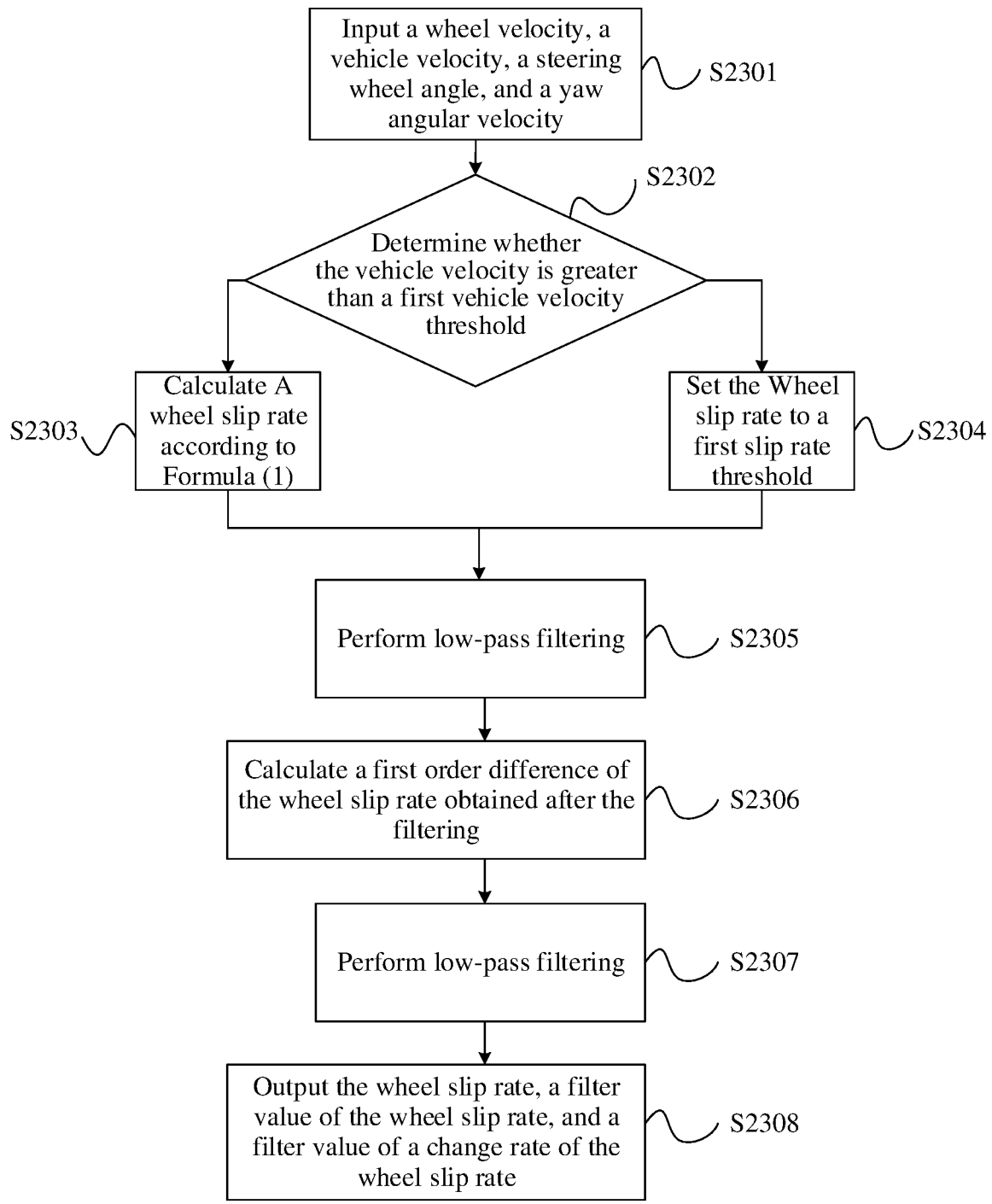
FIG. 6 is a schematic flowchart of a method for determining a wheel slip rate according to an embodiment of this application.

FIG. 6 is a schematic flowchart of a method for determining a wheel slip rate according to an embodiment of this application. As shown in FIG. 6, the method for determining a wheel slip rate may be implemented in the following steps.

S2301. Input the wheel velocity, the vehicle velocity, the steering wheel angle, and the yaw angular velocity.

S2302. Determine whether the vehicle velocity is greater than a first vehicle velocity threshold, and perform S2303 if the vehicle velocity is greater than the first vehicle velocity threshold, or perform S2304 if the vehicle velocity is less than or equal to the first vehicle velocity threshold.

S2303. Calculate the wheel slip rate according to Formula (1):

$$\lambda_i = \begin{cases} \dfrac{v_{w\_i} - \left(v_x \pm \psi\dfrac{t_w}{2}\right)\cos(\delta) - \psi L \sin(\delta)}{\max\left(v_{w\_i}, \left(v_x \pm \psi\dfrac{t_w}{2}\right)\cos(\delta) + \psi L \sin(\delta)\right)} & v_x > v_{TH} \\ 0 & v_x \leq v_{TH} \end{cases} \quad (1)$$

Herein, $v_{TH}$ is a predetermined first vehicle velocity threshold, $t_w$ is a wheel track of the vehicle, and L is a wheel base of the vehicle.

S2304. Set the wheel slip rate to a first slip rate threshold.

For example, the wheel slip rate is set to 0 if the input vehicle velocity is less than the first vehicle velocity threshold.

S2305. Perform low-pass filtering on the wheel slip rate in S2303 or S2304.

S2306. Calculate a first order difference of a wheel slip rate obtained after the filtering.

S2307. Perform low-pass filtering on a wheel slip rate obtained after the first order difference.

S2308. Output the wheel slip rate in S2303 or S2304, a filter value $\lambda_{F\_i}$ of the wheel slip rate, and a filter value $\dot{\lambda}_{F\_i}$ of a change rate of the wheel slip rate.

According to the acceleration slip regulation method in this embodiment of this application, a brand new slip rate estimation method is used to eliminate adverse impact of steering, to help accurately calculate the wheel slip rate.

Optionally, before the control phase in which the acceleration slip regulation is performed on the vehicle is determined, the method 200 further includes the following step.

S240. Determine, based on the wheel slip rate and/or the wheel acceleration, that the vehicle enters an acceleration slip regulation state.

A TCS entry/exit signal $TCS_{active\_i}$ is determined based on the obtained wheel acceleration $a_{w\_i}$, a wheel acceleration $a_{wF\_i}$ obtained after filtering, the wheel slip rate $\lambda_i$, driver demand torque $T_{driver\_i}$ and a TCS demand torque signal $T_{TCS\_i}$. For example, if $TCS_{active\_i}$ is set to "1", it indicates that the vehicle enters the acceleration slip regulation state, or if $TCS_{active\_i}$ is set to "0", it indicates that the vehicle exits from the acceleration slip regulation state.

Optionally, the following two conditions are met to determine that the vehicle enters the acceleration slip regulation state.

A TCS is not started at a previous moment.

The wheel slip rate is greater than a wheel slip rate threshold obtained when the TCS is started or the wheel acceleration is greater than a wheel acceleration threshold obtained when the TCS is started.

Optionally, the following two conditions are met to determine that the vehicle exits from the acceleration slip regulation state.

A TCS has been started at a previous moment.

The wheel slip rate is less than a wheel slip rate threshold at which the TCS exits, and duration of the state exceeds eight program periods, or the driver demand torque is negative, and exceeds two program periods.

It should be understood that before it is determined that the vehicle enters the acceleration slip regulation state, the driver demand torque $T_{driver\_i}$ and the TCS demand torque signal $T_{TCS\_i}$ need to be further obtained.

S120. Determine a current road surface adhesion coefficient of the vehicle.

S130. Determine, based on the current control phase and the current road surface adhesion coefficient, maximum torque allowed by a road surface.

Figure 7A:
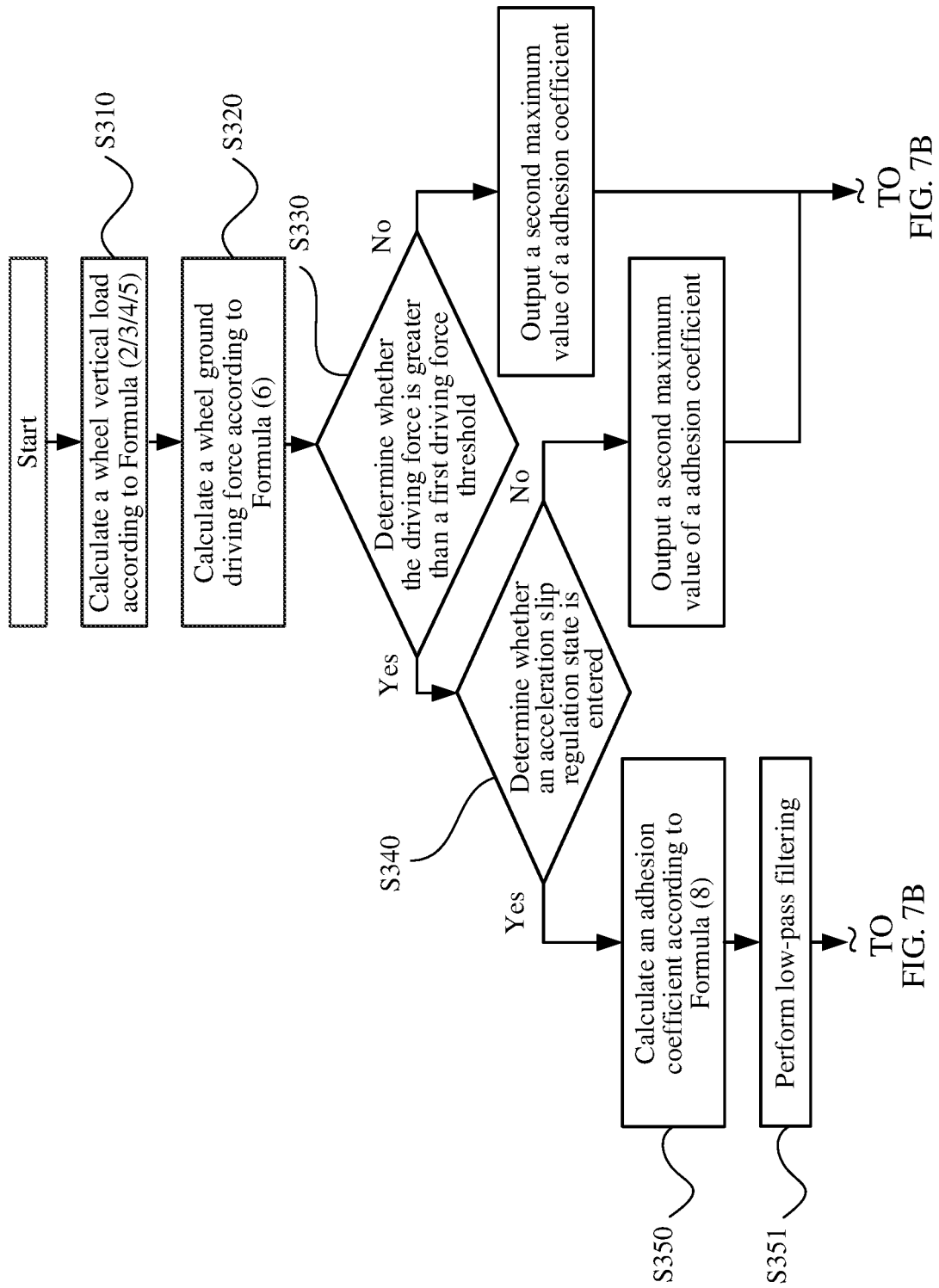

FIG. 7A and FIG. 7B are a schematic flowchart of a method for determining a current road surface adhesion coefficient and maximum torque allowed by a road surface according to an embodiment of this application. As shown in FIG. 7A and FIG. 7B, the method for determining a current road surface adhesion coefficient of a vehicle and maximum torque allowed by a road surface may be implemented in the following steps.

S310. Calculate a wheel vertical load according to Formulas (2), (3), (4), and (5):

$$F_{z\_1} = \frac{m}{2(l_f + l_r)}\left[g(l_r\cos\alpha - h\sin\alpha) - ma_xh - \frac{ma_yhl_r}{t_w}\right] \quad (2)$$

$$F_{z\_2} = \frac{m}{2(l_f + l_r)}\left[g(l_r\cos\alpha - h\sin\alpha) - ma_xh + \frac{ma_yhl_r}{t_w}\right] \quad (3)$$

$$F_{z\_3} = \frac{m}{2(l_f + l_r)}\left[g(l_f\cos\alpha + h\sin\alpha) + ma_xh - \frac{ma_yhl_f}{t_w}\right] \quad (4)$$

$$F_{z\_4} = \frac{m}{2(l_f + l_r)}\left[g(l_f\cos\alpha + h\sin\alpha) + ma_xh + \frac{ma_yhl_f}{t_w}\right] \quad (5)$$

Herein, $a_x$ is a wheel longitudinal acceleration, $a_y$ is a wheel lateral acceleration, $l_f$ is a distance from a center of mass of the vehicle to a front axle, $l_r$ is a distance from the center of mass of the vehicle to a rear axle, and $\alpha$ is a road surface gradient.

S320. Calculate a wheel ground driving force according to Formula (6):

$$T_{d\_i} = T_{motor\_i}i_g - I_w\frac{a_{wF\_i}}{r} - f_0F_{z\_i}r \quad (6)$$

Herein, $i_g$ is a reduction ratio of the vehicle, $I_w$ is wheel rotation inertia of the vehicle, r is a wheel radius of the vehicle, and $f_0$ is a rolling resistance coefficient of the vehicle.

S330. Determine whether the wheel ground driving force obtained through calculation in S320 is greater than a first driving force threshold, and perform S340 if the wheel ground driving force is greater than the first driving force threshold, or if the wheel ground driving force is less than or equal to the first driving force threshold, output a maximum value of the adhesion coefficient, namely, a second maximum value of the adhesion coefficient.

It should be understood that the second maximum value of the adhesion coefficient may be 1, or may be another value. This application is not limited thereto.

Optionally, after the maximum value of the adhesion coefficient, namely, the first maximum value of the adhesion coefficient is output, the maximum torque allowed by the road surface may be calculated according to Formula (7):

$$T_{max\_i} = (\mu_{max\_i} + f_0)F_{z\_i}r + I_w\frac{a_{wF\_i}}{r} \quad (7)$$

Herein, $\mu_{max\_i}$ is the second maximum value of the adhesion coefficient.

S340. Determine whether the vehicle enters an acceleration slip regulation state, and if the vehicle does not enter the acceleration slip regulation state, output a maximum value of the adhesion coefficient, namely, a second maximum value of the adhesion coefficient, or perform S350 if the vehicle enters the acceleration slip regulation state.

It should be understood that the second maximum value of the adhesion coefficient may be 1, or may be another value. This application is not limited thereto.

Optionally, after the maximum value of the adhesion coefficient, namely, the second maximum value of the adhesion coefficient is output, the maximum torque allowed by the road surface may be calculated according to Formula (7). In this case, $\mu_{max\_i}$ is the second maximum value of the adhesion coefficient.

S350. If the vehicle enters the acceleration slip regulation state, calculate a current road surface adhesion coefficient according to Formula (8):

$$\mu_i = \frac{T_{d\_i}}{F_{z\_i} r} \quad (8)$$

S351. Perform low-pass filtering on the current road surface adhesion coefficient obtained through calculation in S350.

S352. Limit an current road surface adhesion coefficient obtained after the low-pass filtering to a predetermined current road surface adhesion coefficient interval.

Optionally, the predetermined adhesion coefficient interval ranges from 0.05 to 1. This application is not limited thereto.

S353. Determine a first maximum value of the adhesion coefficient based on the current road surface adhesion coefficient obtained after the filtering.

S354. Determine whether a current control phase of the vehicle is the same as a control phase of the vehicle in a first sampling period, and if the current control phase of the vehicle is the same as the control phase of the vehicle in the first sampling period, output the second maximum value of the adhesion coefficient, where the second maximum value of the adhesion coefficient is the first maximum value of the adhesion coefficient in S353, or perform S355 if the current control phase of the vehicle is different from the control phase of the vehicle in the first sampling period, where the first sampling period is a previous sampling period of a sampling period to which the current control phase belongs.

It should be understood that if the current control phase of the vehicle is the same as the control phase of the vehicle in the first sampling period, the first maximum value of the adhesion coefficient is output, and the maximum torque allowed by the road surface is calculated using Formula (7).

It should be further understood that the first sampling period is duration for which each program runs on an electronic control unit (ECU) of the vehicle. The electronic control unit may preset a sampling period, for example, preset the sampling period to 10 microseconds. The ECU may detect the current control phase of the vehicle in a current sampling period, and compare the current control phase with a control phase in the previous sampling period. If the current control phase is the same as the control phase in the previous sampling period, the second maximum value of the adhesion coefficient is output.

S355. If the current control phase of the vehicle is different from the control phase of the vehicle in the first sampling period, determine whether the vehicle enters a torque reduction phase for the first time, and if the vehicle does not enter the torque reduction phase for the first time, output the second maximum value of the adhesion coefficient, where the second maximum value of the adhesion coefficient is the first maximum value of the adhesion coefficient in S353, or perform S356 if the vehicle enters the torque reduction phase for the first time, where the first sampling period is the previous sampling period of the sampling period to which the current control phase belongs.

It should be understood that if the vehicle does not enter the torque reduction phase for the first time, the first maximum value of the adhesion coefficient is output, and the maximum torque allowed by the road surface is calculated using Formula (7).

S356. If the vehicle enters the torque reduction phase for the first time, determine the second maximum value of the adhesion coefficient based on actual torque fed back by a drive motor when the vehicle enters the torque reduction phase for the first time.

Optionally, that the second maximum value of the adhesion coefficient is determined based on the actual torque fed back by the drive motor when the vehicle enters the torque reduction phase for the first time includes calculating the adhesion coefficient using k times of the actual torque fed back by the drive motor when the torque reduction phase is entered for the first time.

It should be understood that if the current control phase of the vehicle is different from the control phase of the vehicle in the first sampling period, and the vehicle enters the torque reduction phase for the first time, the second maximum value of the adhesion coefficient is determined based on the actual torque fed back by the drive motor when the vehicle enters the torque reduction phase for the first time, and the maximum torque allowed by the road surface is calculated using Formula (7), where the first sampling period is the previous sampling period of the sampling period to which the current control phase belongs.

It should be further understood that k may be greater than 0 and less than 1, for example, 0.8 or 0.9. This application is not limited thereto.

It should be further understood that processing procedures of S351 to S353 need to be further performed for the adhesion coefficient after the second maximum value of the adhesion coefficient is determined based on the actual torque fed back by the drive motor when the vehicle enters the torque reduction phase for the first time, for example, the adhesion coefficient is calculated using 0.9 times of the actual torque fed back by the drive motor when the torque reduction phase is entered for the first time, to avoid an excessively large error of the adhesion coefficient.

According to the acceleration slip regulation method in this embodiment of this application, an algorithm for identifying the maximum torque allowed by the road surface is used to more accurately identify the maximum torque and the current road surface adhesion coefficient.

S140. Output demand torque for acceleration slip regulation based on the maximum torque allowed by the road surface, where the demand torque for the acceleration slip regulation is used to perform the acceleration slip regulation on the vehicle.

Figure 8:
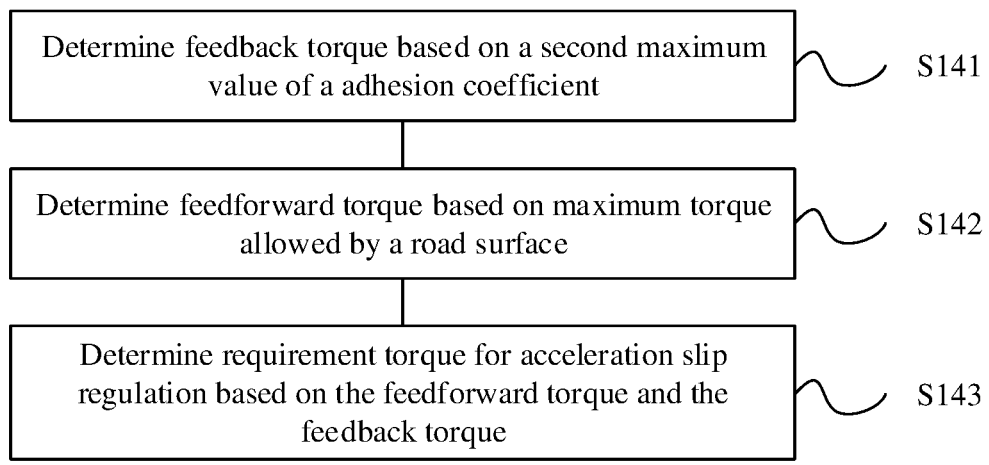
FIG. 8 is a schematic flowchart of a method for determining demand torque for acceleration slip regulation according to an embodiment of this application.

FIG. 8 is a schematic flowchart of a method for determining demand torque for acceleration slip regulation according to an embodiment of this application. As shown in FIG. 8, that the demand torque for the acceleration slip regulation is output based on the maximum torque allowed by the road surface includes the following steps.

S141. Determine feedback torque based on a second maximum value of the adhesion coefficient.

Optionally, that the feedback torque is determined includes determining a first wheel slip rate and a first proportionality coefficient based on the second maximum value of the adhesion coefficient, determining a second wheel slip rate and a second proportionality coefficient based on the vehicle velocity of the vehicle, and determining the feedback torque according to Formula (9), namely, $T_{FB\_i} = \max(0, (\lambda_i - (\lambda_{0\_i}(v_x) + \lambda_{0\_i}(\mu_{max\_i})))(K_{p\_i}(v_x) + K_{p\_i}(\mu_{max\_i})))$, where $T_{FB\_i}$ is the feedback torque, $\mu_{max\_i}$ is the second maximum value of the adhesion coefficient, $v_x$ is the vehicle velocity of the vehicle, $\lambda_{0\_i}(\mu_{max\_i})$ is the first wheel slip rate, $\lambda_{0\_i}(v_x)$ is the second wheel slip rate, $K_{p\_i}(\mu_{max\_i})$ is the first proportionality coefficient, and $K_{p\_i}(v_x)$ is the second proportionality coefficient.

S142. Determine feedforward torque based on the maximum torque allowed by the road surface.

Optionally, that the feedforward torque is determined includes determining first torque based on the wheel slip rate, and determining the feedforward torque according to Formula (10), namely, $$T_{FF\_i} = \min\left(T_{dem\_i} \frac{1}{\tau_1 s^2 + \tau_2 s + 1}, (T_{max\_i} + f(\lambda_i))\right),$$

where $T_{FF\_i}$ is the feedforward torque, $T_{dem\_i}$ is demand torque received by the drive motor, $T_{max\_i}$ is the maximum torque allowed by the road surface, $\tau_1$ is a time constant of a first filter, $\tau_2$ is a time constant of a second filter, and $f(\lambda_i)$ is the first torque.

Optionally, a process of determining adaptive feedforward torque includes determining a current control phase of a vehicle in an acceleration slip regulation state, determining a current road surface adhesion coefficient of the vehicle, determining, based on the current control phase and the current road surface adhesion coefficient, maximum torque allowed by a road surface, obtaining demand torque received by a drive motor of the vehicle and a wheel slip rate of the vehicle, and outputting adaptive feedforward torque for acceleration slip regulation based on the maximum torque allowed by the road surface, the demand torque, and the wheel slip rate, where the adaptive feedforward torque is used to perform the acceleration slip regulation on the vehicle.

In Formula (10), $f(\lambda_i)$ is torque modified based on the wheel slip rate.

Optionally, that the modified torque is calculated based on the wheel slip rate includes determining, based on the wheel slip rate, whether the vehicle returns to a stable area, if the vehicle returns to the stable area, starting a stable timer, and calculating the modified torque based on a time length recorded by the timer.

S143. Determine the demand torque for the acceleration slip regulation based on the feedforward torque and the feedback torque.

Optionally, the demand torque for the acceleration slip regulation is a sum of the feedforward torque and the feedback torque.

That the demand torque for the acceleration slip regulation is determined based on the feedforward torque and the feedback torque includes calculating final output torque for acceleration slip regulation based on a TCS entry/exit signal $TCS_{active\_i}$ and the sum $T_{FF+FB\_i}$ of the feedforward torque $T_{FF\_i}$ and the feedback torque $T_{FB\_i}$.

For example, when $TCS_{active\_i}$ is set to "1", it indicates that the vehicle enters the acceleration slip regulation state. In this case, information indicating that the demand torque $T_{TCS\_i}$ for the acceleration slip regulation is $T_{FF+FB\_i}$ is output. When $TCS_{active\_i}$ is set to "0", it indicates that the vehicle exits from the acceleration slip regulation state. In this case, information indicating that the demand torque $T_{TCS\_i}$ for the acceleration slip regulation is pre-defined maximum torque of the drive motor is output.

It should be understood that a minimum value between final driver demand torque and the demand torque for the acceleration slip regulation is transmitted to a motor controller, to avoid interference to normal driving when the acceleration slip regulation is not activated.

In this embodiment of this application, driving torque is calculated in a feedforward and feedback joint control manner. A wheel slip rate target value in the feedback control manner is dynamically calculated using a dynamic value based on a current vehicle velocity and road surface adhesion condition, and a feedback control coefficient in the feedback control manner is also adaptively adjusted based on the current vehicle velocity and road surface adhesion condition, to improve system adaptation capability. Considering that a specific delay exists in the feedback control manner, the feedforward control manner is introduced. Demand torque output to the motor controller is introduced as a feedforward part (not the driver demand torque) and the maximum torque is used to limit the feedforward part. In this way, a control system can perform "predetermining" to speed up convergence.

According to the acceleration slip regulation method in this embodiment of this application, an adaptive feedforward and feedback joint control method is used to implement acceleration slip regulation, to help enhance robustness and improve a response speed.

The foregoing describes in detail the acceleration slip regulation method in the embodiments of this application with reference to FIG. 2 to FIG. 8. The following describes in detail a vehicle in embodiments of this application with reference to FIG. 9 to FIG. 15.

Figure 9:
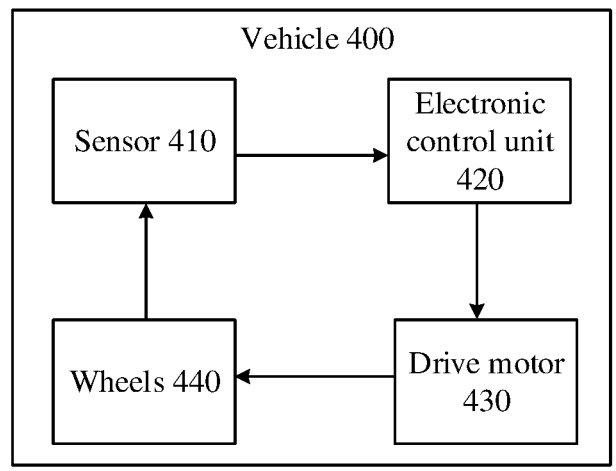
FIG. 9 is a schematic block diagram of a vehicle according to an embodiment of this application.

FIG. 9 is a schematic block diagram of a vehicle 400 according to an embodiment of this application. As shown in FIG. 9, the vehicle 400 includes a sensor 410 and an electronic control unit 420. The sensor 410 is configured to obtain a current road surface parameter. The electronic control unit 420 is configured to determine a current control phase of the vehicle 400 in an acceleration slip regulation state. The electronic control unit 420 is further configured to determine a current road surface adhesion coefficient of the vehicle 400 based on the current road surface parameter. The electronic control unit 420 is further configured to determine, based on the current control phase and the current road surface adhesion coefficient, maximum torque allowed by a road surface. The electronic control unit 420 is further configured to output, to the drive motor 430, demand torque for acceleration slip regulation based on the maximum torque allowed by the road surface, where the demand torque for the acceleration slip regulation is used to perform the acceleration slip regulation on the vehicle 400.

It should be understood that the drive motor 430 may control, based on the demand torque for the acceleration slip regulation that is output by the electronic control unit 420, a transmission device to control wheels 440 of the vehicle 400 to perform the acceleration slip regulation on the vehicle 400.

Figure 10:
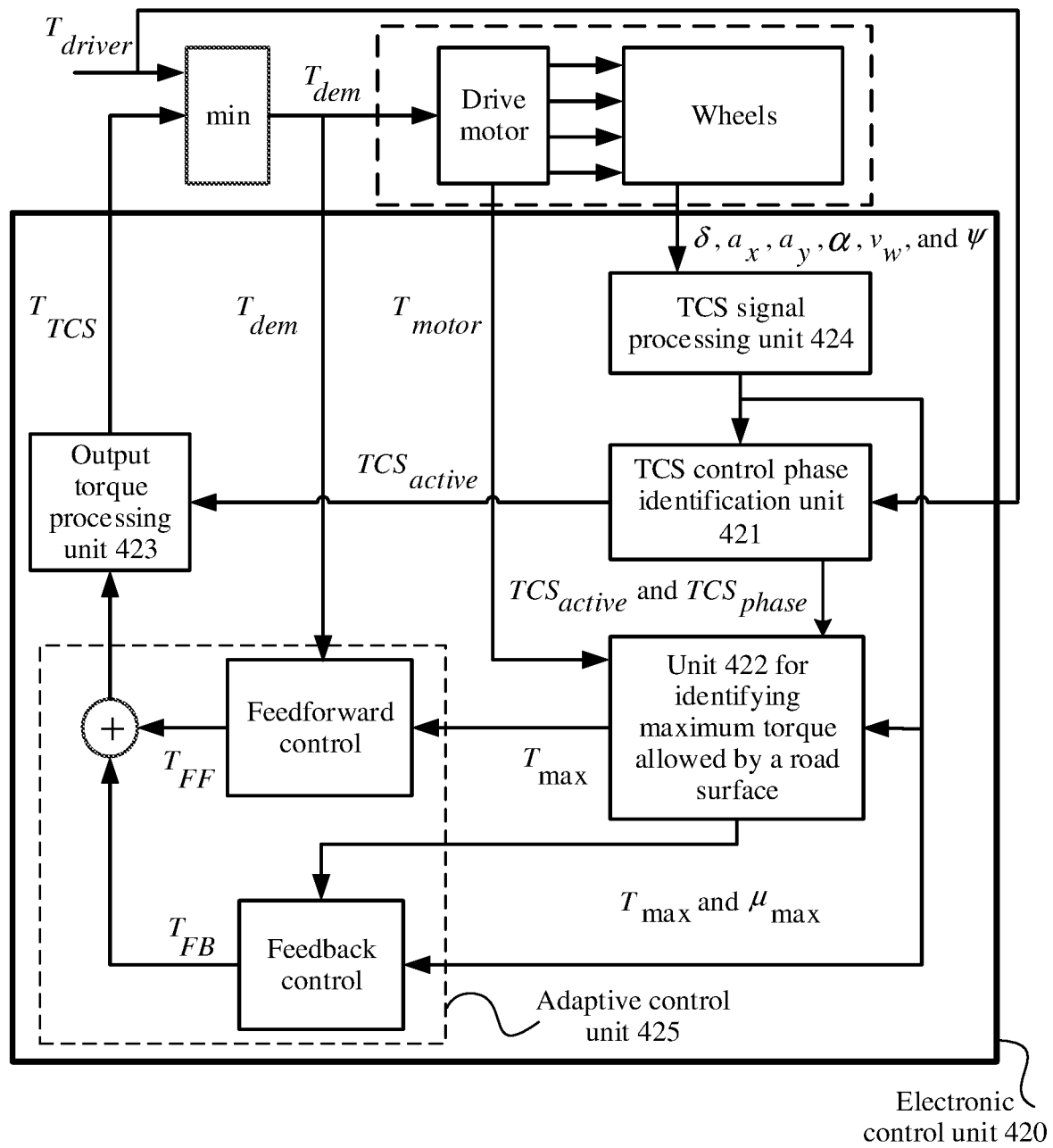
FIG. 10 is a schematic block diagram of an electronic control unit in a vehicle according to an embodiment of this application.

FIG. 10 is a schematic block diagram of the electronic control unit 420. For ease of description, the electronic control unit 420 herein is divided into a TCS control phase identification unit 421, a unit 422 for identifying maximum torque allowed by a road surface, and an output torque processing unit 423.

The TCS control phase identification unit 421 is configured to determine the control phase in which the acceleration slip regulation is performed on the vehicle 400.

The unit 422 for identifying maximum torque allowed by a road surface is configured to determine the current road surface adhesion coefficient of the vehicle.

The unit 422 for identifying maximum torque allowed by a road surface is further configured to determine, based on the current control phase and the current road surface adhesion coefficient, the maximum torque allowed by the road surface.

The output torque processing unit 423 outputs the demand torque for the acceleration slip regulation based on the maximum torque allowed by the road surface, where the demand torque for the acceleration slip regulation is used to perform the acceleration slip regulation on the vehicle 400.

Optionally, as shown in FIG. 10, the electronic control unit 420 further includes a TCS signal processing unit 424, configured to determine a wheel acceleration and a wheel slip rate that are of the vehicle.

Figure 11:
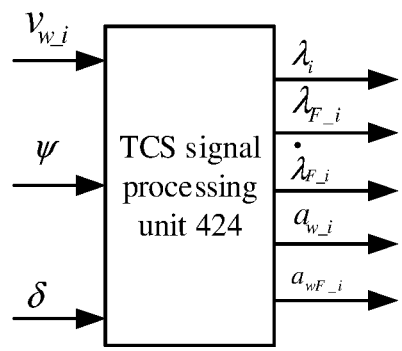
FIG. 11 is a schematic diagram of a TCS signal processing unit according to an embodiment of this application.

FIG. 11 is a schematic diagram of the TCS signal processing unit 424 according to an embodiment of this application. As shown in FIG. 11, the sensor 410 is further configured to obtain a wheel velocity of the vehicle, a vehicle velocity of the vehicle, a yaw angular velocity of the vehicle, and a steering wheel angle of the vehicle.

The TCS signal processing unit 424 is configured to determine the wheel acceleration of the vehicle based on the wheel velocity of the vehicle, and determine the wheel slip rate based on the wheel velocity of the vehicle, the vehicle velocity of the vehicle, and the steering wheel angle and the yaw angular velocity that are of the vehicle.

It should be understood that, the TCS signal processing unit 424 may obtain the wheel velocity of the vehicle, the vehicle velocity of the vehicle, the yaw angular velocity of the vehicle, and the steering wheel angle of the vehicle using the sensor 410, and may also obtain the foregoing parameters in another manner. This application is not limited thereto.

Optionally, the TCS signal processing unit 424 is further configured to determine a wheel velocity signal, calculate a first order difference of the wheel velocity, perform low-pass filtering on the first order difference, and output the wheel acceleration and a filter value of the wheel acceleration.

Optionally, the sensor 410 is further configured to obtain the wheel velocity, the vehicle velocity, the steering wheel angle, and the yaw angular velocity that are of the vehicle 400.

The TCS signal processing unit 424 is further configured to determine whether the vehicle velocity is greater than a first vehicle velocity threshold, and if the vehicle velocity is less than or equal to the first vehicle velocity threshold, set the wheel slip rate to a first slip rate threshold, or if the vehicle velocity is greater than the first vehicle velocity threshold, calculate the wheel slip rate according to Formula (1), perform low-pass filtering on the wheel slip rate, calculate a first order difference of a wheel slip rate obtained after the filtering, perform low-pass filtering on a wheel slip rate obtained after the first order difference, and output the wheel slip rate, a filter value of the wheel slip rate, and a filter value of a change rate of the wheel slip rate.

According to the vehicle in this embodiment of this application, a brand new slip rate estimation method is used to eliminate adverse impact of steering, to help accurately calculate the wheel slip rate.

Optionally, the TCS control phase identification unit 421 is further configured to determine, based on the wheel slip rate and/or the wheel acceleration, that the vehicle enters the acceleration slip regulation state.

The TCS control phase identification unit 421 determines a TCS entry/exit signal based on the obtained wheel acceleration, a wheel acceleration obtained after filtering, the wheel slip rate, driver demand torque, and a TCS demand torque signal. For example, if the TCS entry/exit signal is set to "1", it indicates that the vehicle enters the acceleration slip regulation state, or if the TCS entry/exit signal is set to "0", it indicates that the vehicle exits from the acceleration slip regulation state.

Optionally, the following two conditions are met to determine that the vehicle enters the acceleration slip regulation state.

A TCS is not started at a previous moment.

The wheel slip rate is greater than a wheel slip rate threshold obtained when the TCS is started or the wheel acceleration is greater than a wheel acceleration threshold obtained when the TCS is started.

Optionally, the following two conditions are met to determine that the vehicle exits from the acceleration slip regulation state.

A TCS has been started at a previous moment.

The wheel slip rate is less than a wheel slip rate threshold at which the TCS exits, and duration of the state exceeds eight program periods, or the driver demand torque is negative, and exceeds two program periods.

It should be understood that before it is determined that the vehicle enters the acceleration slip regulation state, the driver demand torque and the TCS demand torque signal need to be further obtained.

Figure 12:
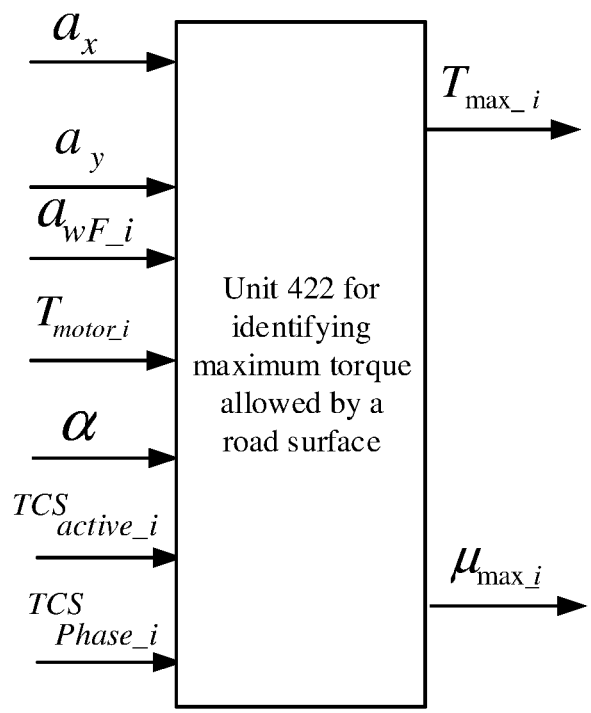
FIG. 12 is a schematic diagram of a unit for identifying maximum torque allowed by a road surface according to an embodiment of this application.

FIG. 12 is a schematic diagram of the unit 422 for identifying maximum torque allowed by a road surface according to an embodiment of this application. As shown in FIG. 12, the unit 422 for identifying maximum torque allowed by a road surface is configured to calculate a wheel vertical load according to Formulas (2), (3), (4), and (5), calculate a wheel ground driving force according to Formula (6), and determine whether the calculated wheel ground driving force is greater than a first driving force threshold, and if the calculated wheel ground driving force is less than or equal to the first driving force threshold, output a maximum value of the adhesion coefficient, namely, a second maximum value of the adhesion coefficient. Optionally, after the maximum value of the adhesion coefficient, namely, the second maximum value of the adhesion coefficient is output, the maximum torque allowed by the road surface may be calculated according to Formula (7).

If the calculated wheel ground driving force is greater than the first driving force threshold, it is determined whether the vehicle enters an acceleration slip regulation state, and if the vehicle does not enter the acceleration slip regulation state, a maximum value of an adhesion coefficient, namely, a second maximum value of the adhesion coefficient is output. Optionally, after the maximum value of the adhesion coefficient, namely, the second maximum value of the adhesion coefficient is output, the maximum torque allowed by the road surface may be calculated according to Formula (7).

If the vehicle enters the acceleration slip regulation state, an adhesion coefficient is calculated according to Formula (8).

Low-pass filtering is performed on the adhesion coefficient obtained through calculation according to Formula (8).

An adhesion coefficient obtained after the low-pass filtering is limited to a predetermined adhesion coefficient interval.

A first maximum value of the adhesion coefficient is determined based on the adhesion coefficient obtained after the filtering.

It is determined whether a current control phase of the vehicle is the same as a control phase of the vehicle in a first sampling period, and if the current control phase of the vehicle is the same as the control phase of the vehicle in the first sampling period, the second maximum value of the adhesion coefficient is output, where the second maximum value of the adhesion coefficient is the first maximum value of the adhesion coefficient. Optionally, after the second maximum value of the adhesion coefficient is output, the maximum torque allowed by the road surface may be calculated according to Formula (7). The first sampling period is a previous sampling period of a sampling period to which the current control phase belongs.

If the current control phase of the vehicle is different from the control phase of the vehicle in the first sampling period, it is determined whether the vehicle enters a torque reduction phase for the first time, and if the vehicle does not enter the torque reduction phase for the first time, the second maximum value of the adhesion coefficient is output, where the second maximum value of the adhesion coefficient is the first maximum value of the adhesion coefficient.

If the vehicle enters the torque reduction phase for the first time, the second maximum value of the adhesion coefficient is determined based on actual torque fed back by a drive motor when the vehicle enters the torque reduction phase for the first time. Optionally, after the second maximum value of the adhesion coefficient is determined, the maximum torque allowed by the road surface may be calculated according to Formula (7).

Optionally, that the second maximum value of the adhesion coefficient is determined based on the actual torque fed back by the drive motor when the vehicle enters the torque reduction phase for the first time includes calculating the adhesion coefficient using 0.9 times of the actual torque fed back by the drive motor when the torque reduction phase is entered for the first time.

It should be understood that if the current control phase of the vehicle is different from the control phase of the vehicle in the first sampling period, and the vehicle enters the torque reduction phase for the first time, the second maximum value of the adhesion coefficient is determined based on the actual torque fed back by the drive motor when the vehicle enters the torque reduction phase for the first time, and the maximum torque allowed by the road surface is calculated using Formula (7).

It should be further understood that if the vehicle enters the torque reduction phase for the first time, the adhesion coefficient may also be calculated based on another number times the actual torque fed back by the drive motor when the vehicle enters the torque reduction phase for the first time, for example, 0.8 times. This application is not limited thereto.

According to the vehicle in this embodiment of this application, an algorithm for identifying the maximum torque allowed by the road surface is used to more accurately identify the maximum torque and the current road surface adhesion coefficient.

Figure 13:
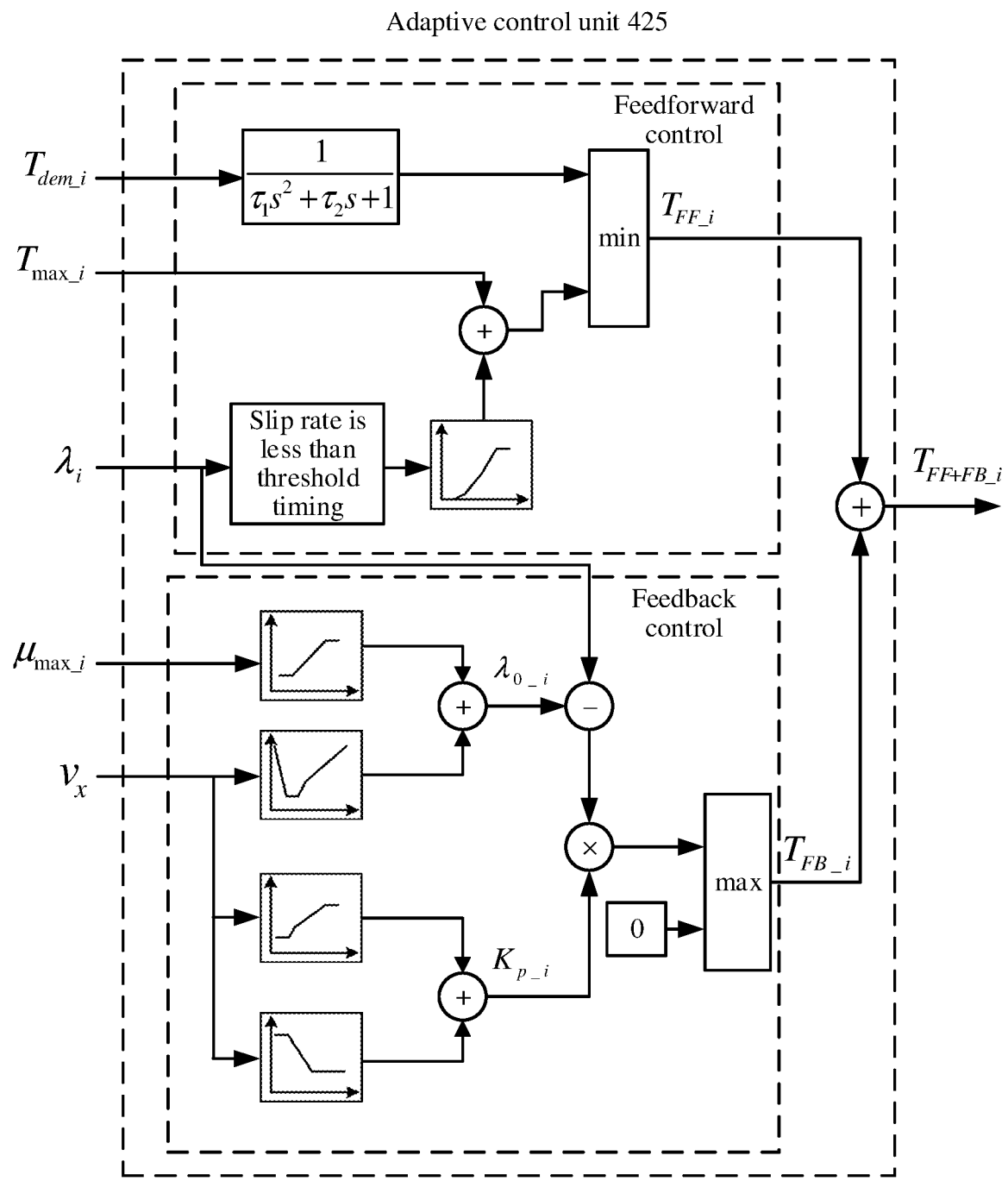
FIG. 13 is a schematic diagram of an adaptive control unit according to an embodiment of this application.

Optionally, as shown in FIG. 10, the vehicle 400 further includes an adaptive control unit 425, configured to determine feedback torque based on the second maximum value of the adhesion coefficient, and determine feedforward torque based on the maximum torque allowed by the road surface FIG. 13 is a schematic diagram of the adaptive control unit 425 according to an embodiment of this application. As shown in FIG. 13, the adaptive control unit 425 is configured to determine a first wheel slip rate and a first proportionality coefficient based on the second maximum value of the adhesion coefficient, determine a second wheel slip rate and a second proportionality coefficient based on the vehicle velocity of the vehicle, and determine the feedback torque according to Formula (9).

Optionally, the adaptive control unit 425 is configured to determine first torque based on the wheel slip rate, and determine the feedforward torque according to Formula (10).

Figure 14:
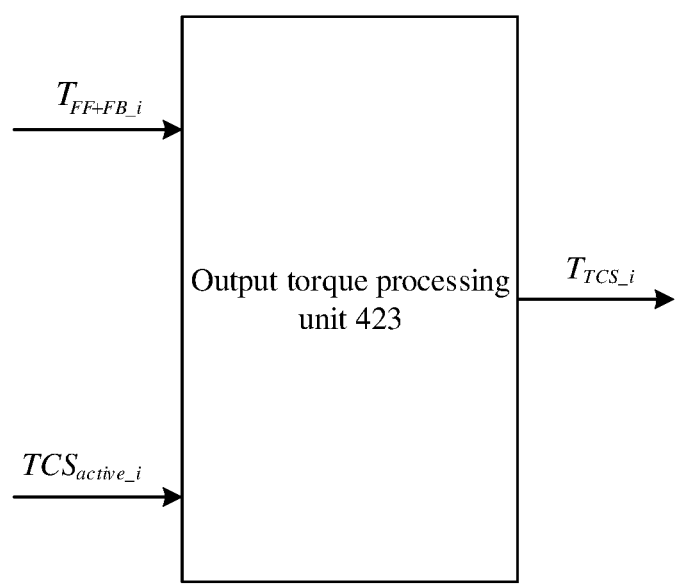
FIG. 14 is a schematic diagram of an output torque processing unit according to an embodiment of this application.

FIG. 14 is a schematic diagram of the output torque processing unit 423 according to an embodiment of this application. As shown in FIG. 14, the output torque processing unit 423 is configured to determine the demand torque for the acceleration slip regulation based on the feedforward torque and the feedback torque.

Optionally, the demand torque for the acceleration slip regulation is a sum of the feedforward torque and the feedback torque.

That the output torque processing unit 423 determines the demand torque for the acceleration slip regulation based on the feedforward torque and the feedback torque includes calculating final output torque for acceleration slip regulation based on a TCS entry/exit signal and the sum of the feedforward torque and the feedback torque.

For example, when the TCS entry/exit signal is set to "1", it indicates that the vehicle enters the acceleration slip regulation state. In this case, information indicating that the demand torque for the acceleration slip regulation is the sum of the feedforward torque and the feedback torque is output. When the TCS entry/exit signal is set to "0", it indicates that the vehicle exits from the acceleration slip regulation state. In this case, information indicating that the demand torque for the acceleration slip regulation is pre-defined maximum torque of the drive motor is output.

It should be understood that a minimum value between final driver demand torque and the demand torque for the acceleration slip regulation is transmitted to a motor controller, to avoid interference to normal driving when the acceleration slip regulation is not activated.

In this embodiment of this application, driving torque is calculated in a feedforward and feedback joint control manner. A wheel slip rate target value in the feedback control manner is dynamically calculated using a dynamic value based on a current vehicle velocity and a road surface adhesion condition, and a feedback control coefficient in the feedback control manner is also adaptively adjusted based on the current vehicle velocity and the road surface adhesion condition, to improve system adaptation capability. Considering that a specific delay exists in the feedback control manner, the feedforward control manner is introduced. Demand torque output to the motor controller is introduced as a feedforward part (not the driver demand torque) and the maximum torque is used to limit the feedforward part. In this way, a control system can perform "predetermining" to speed up convergence.

Figure 15:
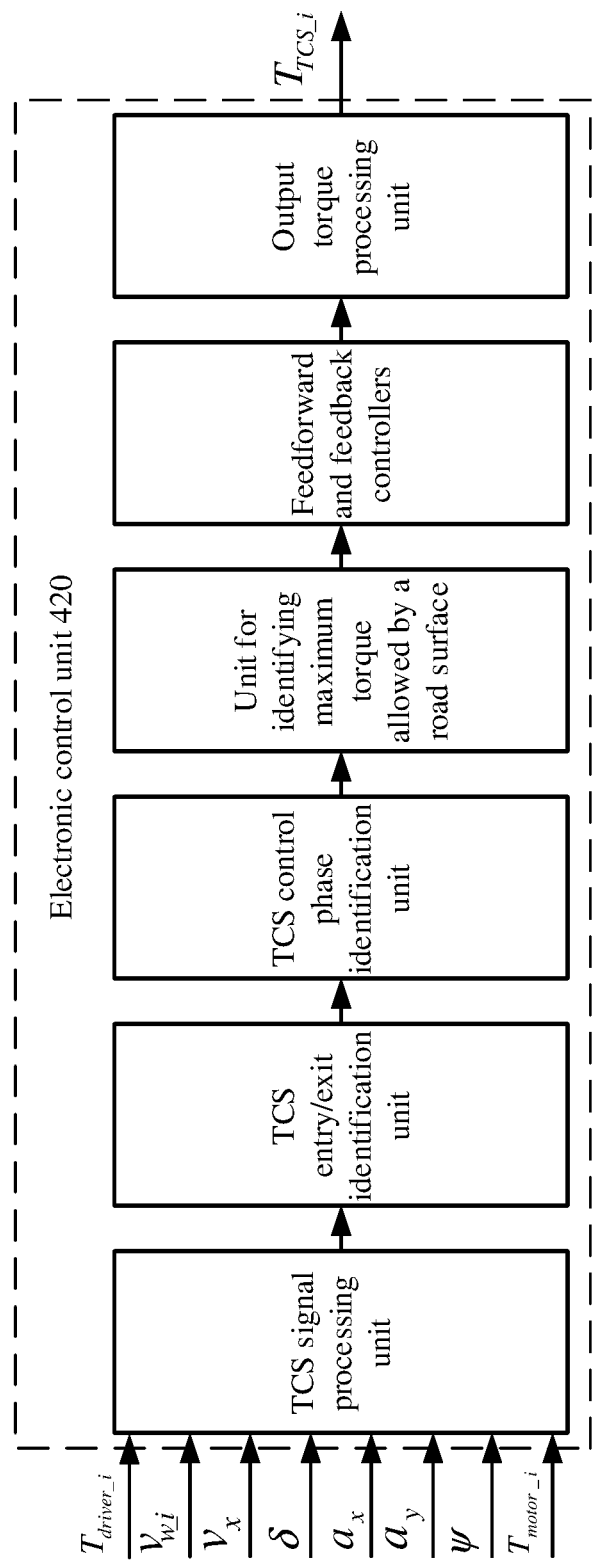
FIG. 15 is another schematic block diagram of an electronic control unit according to an embodiment of this application.

FIG. 15 is a schematic block diagram of the electronic control unit 420 according to an embodiment of this application. As shown in FIG. 15, the electronic control unit 420 obtains driver demand torque $T_{driver\_i}$ (for example, demand torque that is of a four-way motor and that is calculated by a VCU), a wheel velocity signal $v_{w\_j}$ (for example, four wheel velocity signals are obtained by the sensor), a vehicle velocity signal $v_x$ (for example, there is one vehicle velocity signal, and a vehicle velocity may be estimated in a plurality of manners), a steering wheel angle signal δ (for example, one steering wheel angle signal is obtained by the sensor), a longitudinal acceleration signal $a_x$ (for example, one longitudinal acceleration signal is obtained by the sensor), a lateral acceleration signal $a_y$ (for example, one lateral acceleration signal is obtained by the sensor), a yaw angular velocity signal ψ (for example, one yaw angular velocity signal is obtained by the sensor), and an actual torque signal $T_{motor\_i}$ (for example, four actual torque signals are fed back by a motor) of the motor. An output signal is TCS demand torque $T_{TCS\_i}$.

It should be understood that the sensors applied to the vehicle in this embodiment of this application are standard sensors of the vehicle. Therefore, no additional hardware costs are added.

According to the vehicle in this embodiment of this application, an adaptive feedforward and feedback joint control method is used to implement acceleration slip regulation, to help enhance robustness and improve a response speed.

An embodiment of this application further provides a vehicle, and the vehicle includes a sensor, configured to obtain a current road surface parameter, demand torque received by a drive motor of the vehicle, and a wheel slip rate of the vehicle, and a processor, configured to determine a current control phase of the vehicle in an acceleration slip regulation state, and determine a current road surface adhesion coefficient of the vehicle based on the current road surface parameter, determine, based on the current control phase and the current road surface adhesion coefficient, maximum torque allowed by a road surface, and output adaptive feedforward torque for acceleration slip regulation based on the maximum torque allowed by the road surface, the demand torque, and the wheel slip rate, where the adaptive feedforward torque is used to perform the acceleration slip regulation on the vehicle.

Optionally, the processor is configured to calculate the adaptive feedforward torque according to the following formula:

$$T_{FF\_i} = \min\left(T_{dem\_i} \frac{1}{\tau_1 s^2 + \tau_2 s + 1}, (T_{max\_i} + f(\lambda_i))\right),$$

and determine the adaptive feedforward torque.

$T_{FF\_i}$ is the adaptive feedforward torque, where $T_{dem\_i}$ is the demand torque received by the drive motor, $T_{max\_i}$ is the maximum torque allowed by the road surface, $\tau_1$ is a time constant of a first filter, $\tau_2$ is a time constant of a second filter, and $f(\lambda_i)$ is torque modified based on the wheel slip rate.

Optionally, that the processor is configured to determining, based on the wheel slip rate, whether the vehicle returns to a stable area, if the vehicle returns to the stable area, starting a stable timer, and calculating the modified torque based on a time length recorded by the timer.

Optionally, the processor is configured to perform filtering on the current road surface adhesion coefficient, and determine a first maximum value of the adhesion coefficient, and if the current control phase of the vehicle is the same as a control phase of the vehicle in a first sampling period, determine, based on a second maximum value of the adhesion coefficient, the maximum torque allowed by the road surface, where the second maximum value of the adhesion coefficient is the first maximum value of the adhesion coefficient, and the first sampling period is a previous sampling period of a sampling period to which the current control phase belongs.

Optionally, the processor is configured to perform filtering on the current road surface adhesion coefficient, and determine a first maximum value of the adhesion coefficient, and if the current control phase of the vehicle is different from a control phase of the vehicle in a first sampling period, and the vehicle does not enter a torque reduction phase for the first time, determine, based on a second maximum value of the adhesion coefficient, the maximum torque allowed by the road surface, where the second maximum value of the adhesion coefficient is the first maximum value of the adhesion coefficient, and the control phase includes the torque reduction phase, and the first sampling period is a previous sampling period of a sampling period in which the current control phase is located to which the current control phase belongs.

Optionally, the processor is further configured to perform filtering on the current road surface adhesion coefficient, limit a current road surface adhesion coefficient obtained after the filtering to a predetermined adhesion coefficient interval, and determine the first maximum value of the adhesion coefficient based on the current road surface adhesion coefficient obtained after the filtering.

Optionally, the sensor is further configured to obtain actual torque fed back by the drive motor of the vehicle.

The processor is further configured to, if the current control phase of the vehicle is different from a control phase of the vehicle in a first sampling period, and the vehicle enters a torque reduction phase for the first time, determine a second maximum value of the adhesion coefficient based on the actual torque fed back by the drive motor when the vehicle enters the torque reduction phase for the first time, where the control phase includes the torque reduction phase, and determine, based on the second maximum value of the adhesion coefficient, the maximum torque allowed by the road surface, where the first sampling period is a previous sampling period of a sampling period to which the current control phase belongs.

Optionally, the processor is further configured to determine feedback torque based on the second maximum value of the adhesion coefficient, and determine demand torque for the acceleration slip regulation based on the adaptive feedforward torque and the feedback torque, where the demand torque is used to perform the acceleration slip regulation on the vehicle.

Optionally, the processor is further configured to determine the wheel slip rate of the vehicle and a vehicle velocity of the vehicle, determine a first wheel slip rate and a first proportionality coefficient based on the second maximum value of the adhesion coefficient, determine a second wheel slip rate and a second proportionality coefficient based on the vehicle velocity of the vehicle, and determine the feedback torque according to a formula $T_{FB\_i} = \max(0, (\lambda_i - \lambda_{0\_i}(v_x) + \lambda_{0\_i}(\mu_{max\_i}))) (K_{p\_i}(v_x) + K_{p\_i}(\mu_{max\_i})))$, where $T_{FB\_i}$ is the feedback torque, i represents any one of the wheels of the vehicle, and the wheels of the vehicle include a left front wheel, a right front wheel, a left rear wheel, and a right rear wheel, $\lambda_i$ is the wheel slip rate of the vehicle; $\mu_{max\_i}$ is the second maximum value of the adhesion coefficient, $v_x$ is the vehicle velocity of the vehicle; $\lambda_{0\_i}(\mu_{max\_i})$ is the first wheel slip rate, $\lambda_{0\_i}(v_x)$ is the second wheel slip rate, $K_{p\_i}(\mu_{max\_i})$ is the first proportionality coefficient, and $K_{p\_i}(v_x)$ is the second proportionality coefficient.

Optionally, the sensor is further configured to obtain a road surface gradient.

The processor is further configured to determine a wheel vertical load of the vehicle based on the road surface gradient, determine the wheel ground driving force based on the wheel vertical load, and determine the current road surface adhesion coefficient based on the wheel ground driving force.

Optionally, the sensor is further configured to obtain a wheel velocity of the vehicle, a yaw angular velocity of the vehicle, and a steering wheel angle of the vehicle.

The processor is further configured to determine a wheel acceleration of the vehicle based on the wheel velocity of the vehicle, determine the wheel slip rate based on the wheel velocity of the vehicle, the vehicle velocity of the vehicle, and the steering wheel angle and the yaw angular velocity that are of the vehicle, and determine, based on the wheel slip rate and/or the wheel acceleration, that the vehicle enters the acceleration slip regulation state.

It should be understood that the processor may be the electronic control unit or a part of the electronic control unit.

In the embodiments of this application, the electronic control unit may be a central processing unit (CPU), a network processor (NP), or a combination of a CPU and an NP. The electronic control unit may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

All or some of the foregoing embodiments may be implemented using software, hardware, firmware, or any combination thereof. When being implemented using software, all or some of the embodiments may be implemented in a form of a computer program product. The computer program product may include one or more computer program instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer program instructions may be stored in a computer readable storage medium or may be transmitted from a computer readable storage medium to another computer readable storage medium. For example, the computer program instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid state disk (SSD), or the like.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division. There may be another division manner during actual implementation. For example, a plurality of units or components may be combined or integrated into another system, or some features may be ignored or may not be performed. In addition, the displayed or discussed mutual couplings or direct couplings or communication connections may be implemented using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a universal serial bus (USB) flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An acceleration slip regulation method implemented by a vehicle on a road surface, comprising:
  determining a current control phase of a vehicle in an acceleration slip regulation state, wherein the current control phase is a torque reduction phase;
  determining a current road surface adhesion coefficient of the vehicle;

determining a maximum torque allowed by the road surface based on the current control phase and the current road surface adhesion coefficient by:
  determining a first maximum value of the current road surface adhesion coefficient based on an actual torque fed back drive motor of the vehicle when the vehicle enters the torque reduction phase and when the current control phase of the vehicle is different from a control phase of the vehicle in a previous sampling period; and
  determining the maximum torque allowed by the road surface based on the first maximum value of the current road surface adhesion coefficient;
obtaining a demand torque for the drive motor of the vehicle;
obtaining a wheel slip rate of the vehicle;
outputting an adaptive feedforward torque for acceleration slip regulation of the vehicle based on the maximum torque allowed by the road surface, the demand torque, and the wheel slip rate;
determining a feedback torque based on the first maximum value of the current road surface adhesion coefficient; and
determining a demand torque for the acceleration slip regulation based on the adaptive feedforward torque and the feedback torque, wherein the demand torque for the acceleration slip regulation is a sum of the feedforward torque and the feedback torque.

2. The method of claim 1, wherein outputting the adaptive feedforward torque of the vehicle for the acceleration slip regulation based on the maximum torque allowed by the road surface, the demand torque, and the wheel slip rate comprises determining the adaptive feedforward torque according to the demand torque, the maximum torque allowed by the road surface, and a torque modified based on the wheel slip rate.

3. The method of claim 2, further comprising:
  determining whether the vehicle returns to a stable area based on the wheel slip rate;
  starting a stable timer when the vehicle returns to the stable area; and
  calculating the torque modified based on the wheel slip rate according to a time length recorded by the stable timer.

4. The method of claim 1, wherein determining the maximum torque allowed by the road surface comprises:
  performing low-pass filtering on the current road surface adhesion coefficient;
  determining the first maximum value of the current road surface adhesion coefficient; and
  determining the maximum torque allowed by the road surface based on the first maximum value of the current road surface adhesion coefficient when the current control phase of the vehicle is the same as a control phase of the vehicle in a first sampling period, and wherein the first sampling period is a previous sampling period of a sampling period to which the current control phase belongs.

5. The method of claim 4, wherein performing the low-pass filtering on the current road surface adhesion coefficient and determining the first maximum value of the current road surface adhesion coefficient comprises:
  limiting a filtered adhesion coefficient obtained after performing the low-pass filtering on the current road surface adhesion coefficient to a predetermined adhesion coefficient interval; and
  determining that a maximum value of the current road surface adhesion coefficient obtained after performing the low-pass filtering on the current road surface adhesion coefficient is the first maximum value of the current road surface adhesion coefficient.

6. The method of claim 1, wherein determining the maximum torque allowed by the road surface comprises:
  performing low-pass filtering on the current road surface adhesion coefficient;
  determining the first maximum value of the current road surface adhesion coefficient; and
  determining the maximum torque allowed by the road surface based on the first maximum value of the current road surface adhesion coefficient when the current control phase of the vehicle is different from a control phase of the vehicle in a first sampling period and when the vehicle does not enter a torque reduction phase for a first time, wherein the first sampling period is a previous sampling period of a sampling period to which the current control phase belongs.

7. The method of claim 1, further comprising determining, the actual torque of the drive motor of the vehicle, wherein the previous sampling period is a sampling period prior to a current sampling period to which the current control phase belongs, and wherein the vehicle enters the torque reduction phase for a first time.

8. A vehicle, comprising:
  a sensor configured to obtain a current road surface parameter of the vehicle; and
  a processor coupled to the sensor and configured to:
    determine a current control phase of the vehicle in an acceleration slip regulation state, wherein the current control phase is a torque reduction phase;
    determine a current road surface adhesion coefficient of the vehicle based on the current road surface parameter;
    determine a maximum torque allowed by a road surface based on the current control phase and the current road surface adhesion coefficient, wherein, to determine the maximum torque, the processor is further configured to:
      determine a first maximum value of the current road surface adhesion coefficient based on an actual torque fed back by a drive motor of the vehicle when the vehicle enters the torque reduction phase and when the current control phase of the vehicle is different from a control phase of vehicle in a previous sampling period; and
      determine the maximum torque allowed by the road surface based on the first maximum value of the current road surface adhesion coefficient;
    obtain a demand torque for the drive motor of the vehicle;
    obtain a wheel slip rate of the vehicle;
    output an adaptive feedforward torque for acceleration slip regulation of the vehicle based on the maximum torque allowed by the road surface, the demand torque, and the wheel slip rate;
    determine a feedback torque based on a first maximum value of the current road surface adhesion coefficient; and
    determine a demand torque for the acceleration slip regulation based on the adaptive feedforward torque and the feedback torque, wherein the demand torque for the acceleration slip regulation is a sum of the feedforward torque and the feedback torque.

9. The vehicle of claim 8, wherein the processor is further configured to calculate the adaptive feedforward torque according to the demand torque, the maximum torque allowed by the road surface, and a torque modified based on the wheel slip rate.

10. The vehicle of claim 9, wherein the processor is further configured to:
   determine whether the vehicle returns to a stable area based on the wheel slip rate;
   starting a stable timer when the vehicle returns to the stable area; and
   calculate the torque modified based on the wheel slip rate based on a time length recorded by the stable timer.

11. The vehicle of claim 8, wherein the processor is further configured to:
   perform filtering on the current road surface adhesion coefficient;
   determine the first maximum value of the current road surface adhesion coefficient; and
   determine the maximum torque allowed by the road surface based on the first maximum value of the current road surface adhesion coefficient when the current control phase of the vehicle is the same as a control phase of the vehicle in a first sampling period, wherein the first sampling period is a previous sampling period of a sampling period to which the current control phase belongs.

12. The vehicle of claim 11, wherein the processor is further configured to:
   limit a filtered adhesion coefficient obtained after performing the filtering on the current road surface adhesion coefficient to a predetermined adhesion coefficient interval; and
   determine the first maximum value of the current road surface adhesion coefficient based on the current road surface adhesion coefficient obtained after performing the filtering on the current road surface adhesion coefficient.

13. The vehicle of claim 8, wherein the processor is further configured to:
   perform filtering on the current road surface adhesion coefficient;
   determine the first maximum value of the current road surface adhesion coefficient; and
   determine the maximum torque allowed by the road surface based on the first maximum value of the current road surface adhesion coefficient when the current control phase of the vehicle is different from a control phase of the vehicle in a first sampling period and when the vehicle does not enter a torque reduction phase for a first time, and wherein the first sampling period is a previous sampling period of a sampling period to which the current control phase belongs.

14. The vehicle of claim 8, wherein the sensor is further configured to obtain the actual torque of the drive motor of the vehicle wherein the previous sampling period is a sampling period prior to a current sampling period to in which the current control phase is located.

15. The vehicle of claim 8, wherein the processor is further configured to:
   determine a vehicle velocity of the vehicle;
   determine a first wheel slip rate and a first proportionality coefficient based on the first maximum value of the current road surface adhesion coefficient;
   determine a second wheel slip rate and a second proportionality coefficient based on the vehicle velocity of the vehicle; and
   determine the feedback torque according to a formula $T_{FB\_i} = \max(0, (\lambda_i - (\lambda_{0\_i}(v_x) + \lambda_{0\_i}(\mu_{max\_i})))(K_{p\_i}(v_x) + K_{p\_i}(\mu_{max\_i})))$, wherein $T_{FB\_i}$ is the feedback torque, i represents a wheel of the vehicle, $\lambda_i$ is the wheel slip rate of the vehicle, $\mu_{max\_i}$ is the first maximum value of the current road surface adhesion coefficient, $v_x$ is the vehicle velocity of the vehicle, $\lambda_{0\_i}(\mu_{max\_i})$ is the first wheel slip rate, $\lambda_{0\_i}(v_x)$ is the second wheel slip rate, $K_{p\_i}(\mu_{max\_i})$ is the first proportionality coefficient; and $K_{p\_i}(v_x)$ is the second proportionality coefficient, and wherein vehicle comprises a left front wheel, a right front wheel, a left rear wheel, and a right rear wheel.

16. The vehicle of claim 8, wherein the sensor is further configured to obtain a road surface gradient, and wherein the processor is further configured to:
   determine a wheel vertical load of the vehicle based on the road surface gradient;
   determine a wheel ground driving force based on the wheel vertical load; and
   determine the current road surface adhesion coefficient based on the wheel ground driving force.

17. The vehicle of claim 8, wherein the sensor is further configured to obtain a wheel velocity of the vehicle, a yaw angular velocity of the vehicle, and a steering wheel angle of the vehicle, and wherein the processor is further configured to:
   determine a wheel acceleration of the vehicle based on the wheel velocity of the vehicle;
   determine the wheel slip rate based on the wheel velocity of the vehicle, a vehicle velocity of the vehicle, and the steering wheel angle and the yaw angular velocity of the vehicle; and
   determine that the vehicle enters the acceleration slip regulation state based on at least one of the wheel slip rate or the wheel acceleration.

18. An apparatus mounted on a vehicle, the apparatus comprising:
   a memory configured to store instructions; and
   a processor coupled to the memory and configured to execute the instructions, which cause the apparatus to:
      determine a current control phase of the vehicle in an acceleration slip regulation state, wherein the current control phase is a torque reduction phase;
      determine a current road surface adhesion coefficient of the vehicle;
      determine a maximum torque allowed by a road surface based on the current control phase and the current road surface adhesion coefficient, wherein, to determine the maximum torque, the instructions hither cause the apparatus to:
         determine a first maximum value of the current road surface adhesion coefficient based on an actual torque fed back by a drive motor of the vehicle when the vehicle enters the torque reduction phase and when the current control phase of the vehicle is different from a control phase of vehicle in a previous sampling period; and
         determine the maximum torque allowed by the road surface based on the first maximum value of the current road surface adhesion coefficient;
      obtain a demand torque for the drive motor of the vehicle;
      obtain a wheel slip rate of the vehicle;
      output an adaptive feedforward torque for acceleration slip regulation of the vehicle based on the maximum torque allowed by the road surface, the demand torque, and the wheel slip rate;

determine a feedback torque based on a first maximum value of the current road surface adhesion coefficient; and determine a demand torque for the acceleration slip regulation based on the adaptive feedforward torque and the feedback torque, wherein the demand torque for the acceleration slip regulation is a sum of the feedforward torque and the feedback torque.

19. The apparatus of claim 18, wherein the instructions further cause the apparatus to determine the adaptive feedforward torque according to the demand torque, the maximum torque allowed by the road surface, and a torque modified based on the wheel slip rate.

20. The apparatus of claim 18, wherein the instructions further cause the apparatus to:

determine whether the vehicle returns to a stable area based on the wheel slip rate;

start a stable timer when the vehicle returns to the stable area; and calculate the torque modified based on the wheel slip rate according to a time length recorded by the stable timer.

\* \* \* \* \*

UNITED STATES PATENT AND TRADEMARK OFFICE
CERTIFICATE OF CORRECTION

| | | |
|---|---|---|
| PATENT NO. | : 11,465,628 B2 | Page 1 of 1 |
| APPLICATION NO. | : 16/694256 | |
| DATED | : October 11, 2022 | |
| INVENTOR(S) | : Yongsheng Zhang, Wei Zhang and Biao Jin | |

It is certified that error appears in the above-identified patent and that said Letters Patent is hereby corrected as shown below:

In the Claims

Claim 14, Column 29, Line 56: "vehicle wherein" should read "vehicle, wherein"

Claim 18, Column 30, Line 49: "instructions hither" should read "instructions further"

Signed and Sealed this
Thirteenth Day of December, 2022

*Katherine Kelly Vidal*

Katherine Kelly Vidal
*Director of the United States Patent and Trademark Office*